US012544884B2

(12) United States Patent
Hattori

(10) Patent No.: US 12,544,884 B2
(45) Date of Patent: Feb. 10, 2026

(54) IMPACT TOOL

(71) Applicant: MAKITA CORPORATION, Anjo (JP)

(72) Inventor: Tomoya Hattori, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/036,110

(22) Filed: Jan. 24, 2025

(65) Prior Publication Data

US 2025/0249556 A1 Aug. 7, 2025

(30) Foreign Application Priority Data

Feb. 2, 2024 (JP) ................................. 2024-015073

(51) Int. Cl.
*B25B 21/02* (2006.01)
*B25F 5/00* (2006.01)

(52) U.S. Cl.
CPC .............. *B25B 21/02* (2013.01); *B25F 5/001* (2013.01)

(58) Field of Classification Search
CPC ........ B25B 21/02; B25B 21/026; B25F 5/001
USPC .......... 173/81, 90, 93, 140–141, 162.1, 197, 173/198, 213, 168–171
See application file for complete search history.

(56) References Cited

U.S. PATENT DOCUMENTS 4,494,615 A * 1/1985 Jones .................... E21B 31/107 173/202
11,626,820 B2 * 4/2023 Ni ........................... B25B 21/02 81/464
2010/0000749 A1 * 1/2010 Andel ..................... B25B 21/02 173/202
2012/0000683 A1 * 1/2012 Nagasaka ............ B25B 21/026 173/93.5
2013/0062088 A1 * 3/2013 Mashiko ................. B25B 21/02 173/48
2013/0126202 A1 * 5/2013 Oomori ................... B25B 21/00 173/217
2016/0250738 A1 * 9/2016 Leh ..................... B25B 23/1475 173/176

(Continued)

FOREIGN PATENT DOCUMENTS

EP 0105430 B1 * 5/1990 ................ B25F 3/00
EP 4438230 A1 * 10/2024 ......... B25B 23/1475

(Continued)

*Primary Examiner* — Robert F Long
(74) *Attorney, Agent, or Firm* — J-TEK LAW PLLC; Jeffrey D. Tekanic; Scott T. Wakeman

(57) ABSTRACT

An impact tool includes: a motor; a hammer, which is rotated by the motor; an anvil, which is impacted by the hammer in a rotational direction; two or more springs, which bias the hammer forward toward the anvil and are disposed parallel to each other; a cam mechanism, which alternately retracts the hammer while compressing the springs in response to application of the driving force of the motor and permits the hammer to be advanced by the elastic force of the compressed springs; and a hammer-housing part, which houses the hammer. The springs bias the hammer with a combined set load in the state in which the hammer is at an advancement limit position of the hammer, where the value calculated by dividing the combined spring constant (N/mm) of the springs there by the combined set load (N) of the springs there is larger than 0.3.

20 Claims, 13 Drawing Sheets

(56) References Cited

U.S. PATENT DOCUMENTS

| | | | | |
|---|---|---|---|---|
| 2016/0333542 | A1* | 11/2016 | Jinnings | B25D 9/06 |
| 2017/0028537 | A1* | 2/2017 | McClung | B25B 23/0035 |
| 2017/0070168 | A1* | 3/2017 | Takano | H02P 6/16 |
| 2017/0165817 | A1* | 6/2017 | Vogt | B25B 21/02 |
| 2019/0255687 | A1* | 8/2019 | Schneider | B25B 21/02 |
| 2019/0321957 | A1* | 10/2019 | Stoner | B25D 9/04 |
| 2020/0023501 | A1* | 1/2020 | Bandy | B25B 21/02 |
| 2020/0180128 | A1* | 6/2020 | Schneider | B25D 11/06 |
| 2020/0215668 | A1* | 7/2020 | Duncan | B25B 21/026 |
| 2021/0162574 | A1* | 6/2021 | Dedrickson | B25D 17/06 |
| 2021/0339361 | A1* | 11/2021 | Abbott | B25B 21/026 |
| 2022/0111502 | A1* | 4/2022 | Abbott | B25B 23/1475 |
| 2023/0234193 | A1* | 7/2023 | Xu | B25B 21/02<br>173/93 |
| 2023/0364752 | A1* | 11/2023 | Kawai | B25B 21/026 |
| 2024/0022152 | A1* | 1/2024 | Lucon | H02K 33/16 |
| 2024/0208013 | A1* | 6/2024 | Hirabayashi | B25B 23/18 |
| 2025/0114923 | A1* | 4/2025 | Kawai | B25B 21/02 |
| 2025/0249557 | A1* | 8/2025 | Tomayko | B25B 21/026 |

FOREIGN PATENT DOCUMENTS

| | | | | | |
|---|---|---|---|---|---|
| JP | 2004291136 | A | * | 10/2004 | B25B 21/026 |
| JP | 2018187700 | A | | 11/2018 | |
| TW | 1334378 | B | * | 12/2010 | B25F 5/006 |
| WO | WO-2015182511 | A1 | * | 12/2015 | B25B 21/02 |
| WO | WO-2018080786 | A1 | * | 5/2018 | B25B 13/06 |
| WO | WO-2018155074 | A1 | * | 8/2018 | B25B 21/00 |

* cited by examiner

IMPACT TOOL

CROSS-REFERENCE TO RELATED APPLICATION

This application claims priority to Japanese patent application no. 2024-015073 filed on Feb. 2, 2024, the contents of which are fully incorporated herein by reference.

TECHNICAL FIELD

The techniques disclosed in the present specification relate to an impact tool.

BACKGROUND ART

Japanese Laid-open Patent Publication 2018-187700 discloses an impact tool that comprises an anvil, which is impacted in the rotational direction by a hammer. The driving force of a motor is converted into a force in a retraction direction of the hammer by a cam mechanism, causing the hammer to retract while compressing a spring. When the retracting hammer is retracted (moved) axially beyond the anvil, the elastic energy of the spring is released, and the hammer advances while rotating, thereby impacting (hammering) the anvil in the rotational direction.

SUMMARY OF THE INVENTION

When the hammer impacts the anvil, a reaction force from a fastening member (a bolt, a screw, or the like) acts on the hammer in a direction that causes the hammer to retract. The magnitude of the reaction force in relation to the impact varies in accordance with the size of the fastening member. When the reaction force is too large, the hammer retracts excessively and collides with (axially strikes) a rear-side member, the spring reaches its solid length and the hammer stops suddenly, etc. On the other hand, when the reaction force is too small, the amount of retraction of the hammer may become too small (short) such that the hammer collides with (axially strikes) the anvil in the axial direction (i.e. an axial end of the anvil) as the hammer moves forward. In the present specification, such types of impacts, which occur when the amount of retraction of the hammer is either excessive or insufficient, will be collectively referred to as “abnormal impacts”, because such impacts are different from the originally intended proper impacts (i.e. rotational impacts) and are thus undesirable. When an abnormal impact occurs, vibrations in the movement (axial) direction of the hammer occur in the impact tool, or the impact force of the hammer decreases, thereby impairing the user’s impression of the impact tool.

It is therefore one non-limiting object of the present teachings to disclose techniques for curtailing, or even eliminating, occurrences of abnormal impacts.

In one non-limiting aspect of the present teachings, an impact tool may comprise: a motor; a hammer, which is rotated by the motor; an anvil, which is impacted by the hammer in a rotational direction; two or more springs, which bias the hammer forward toward the anvil in an axial direction and are disposed parallel to each other; a cam mechanism, which alternately retracts the hammer while compressing the springs in the axial direction in response to application of the driving force of the motor and permits the hammer to be advanced in the axial direction by the elastic force of the compressed springs; and a hammer-housing part, which houses the hammer. In the state in which the hammer is at an advancement limit position of the hammer, the springs preferably bias the hammer with a combined set load. Further preferably, the value calculated by dividing the combined spring constant (N/mm) of the springs at the advancement limit position by the combined set load (N) of the springs at the advancement limit position may be larger than 0.3.

Such an embodiment enables occurrences of abnormal impacts to be curtailed.

DETAILED DESCRIPTION OF THE INVENTION

Figure 1:
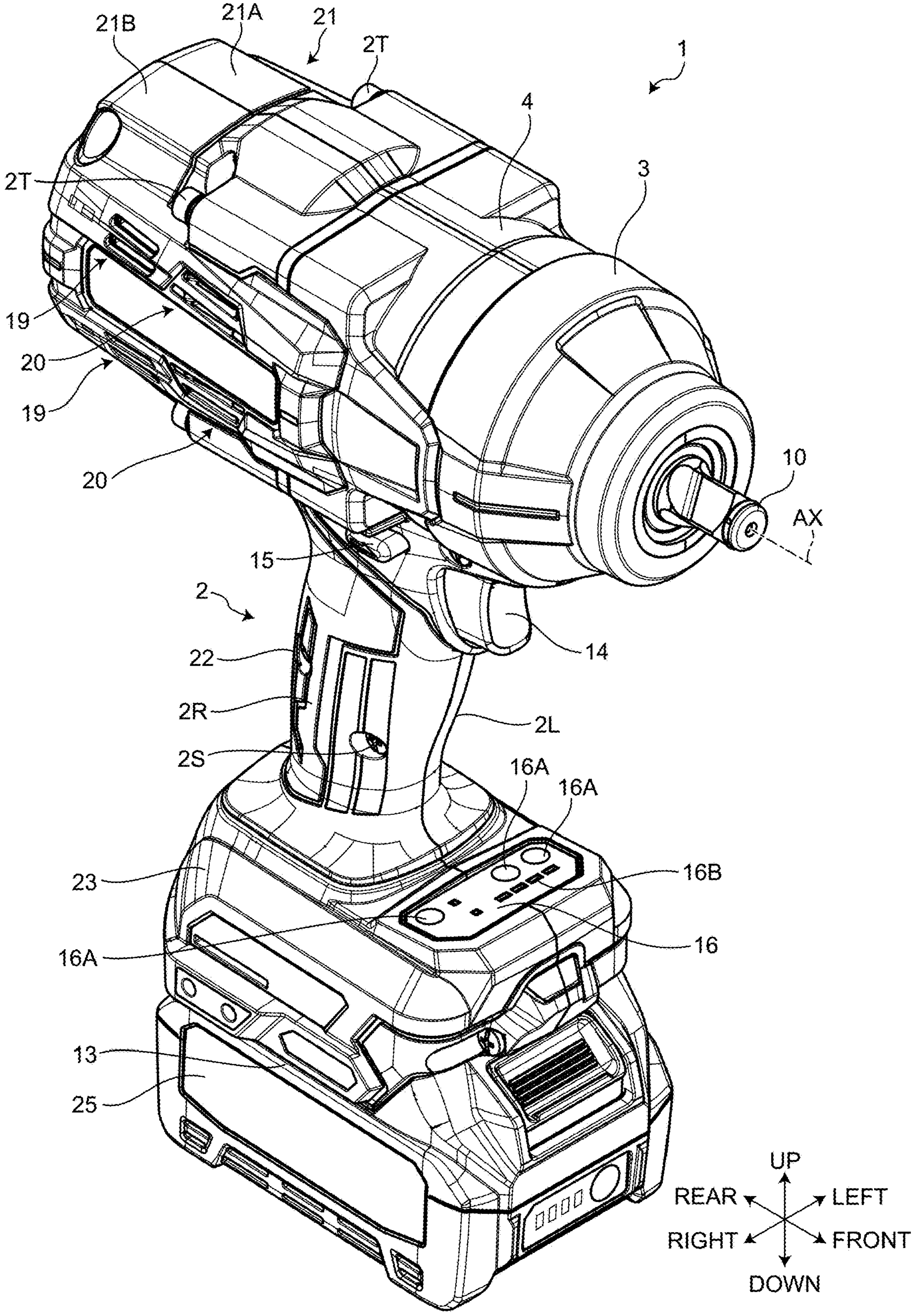
FIG. 1 is an oblique view, viewed from the right front, that shows an impact tool according to an embodiment of the present teachings.

As was described above, an impact tool according to the present teachings may comprise: a motor; a hammer, which is rotated by the motor; an anvil, which is impacted by the hammer in a rotational direction; two or more springs, which bias the hammer forward toward the anvil and are disposed parallel to each other, preferably concentrically; a cam mechanism, which alternately retracts the hammer while compressing the springs in response to application of the driving force of the motor and permits the hammer to be advanced by the elastic force of the compressed springs; and a hammer-housing part, which houses the hammer. In the state in which the hammer is at an advancement limit position of the hammer, the springs biases the hammer with a combined set load. The value calculated by dividing the combined spring constant (N/mm) of the springs by the combined set load (N) of the springs is preferably larger than 0.3. The value calculated by dividing the combined spring constant of the springs by the combined set load of the springs is referred to as "ratio Rm" below.

The (combined) set load is the magnitude of the elastic force of the spring(s) in the state in which the hammer is at the advancement limit position of the hammer. It is noted that the set load is not the load required during assembly. The set load corresponds to the initial state of the elastic force of the spring(s) when the spring(s) are mounted on the impact tool. The set load corresponds to the spring force of the springs when the springs have been compressed by the difference between the natural length of the spring and the length of the spring at the time of setting (the set length). The combined set load is the magnitude of the overall elastic force of the two or more springs in the state in which the hammer is at the advancement limit position. That is, the combined set load is the set load in embodiments in which the two or more springs are considered, hypothetically, to be one spring. Similarly, the combined spring constant is the spring constant in embodiments in which the two or more springs are considered, hypothetically, to be one spring.

In the above-mentioned configuration, the smaller that the (combined) set load and the larger that the (combined) spring constant of the springs are, the larger that the value (ratio Rm) calculated by dividing the (combined) spring constant by the (combined) set load is. If the (combined) set load is relatively small, the amount of retraction of the hammer becomes relatively large even in the situation in which the reaction force from a fastening member (a bolt, a screw, or the like) is small at the time of impact. Therefore, occurrences of collisions of the hammer with the anvil in the axial direction owing to an insufficient amount of retraction can be curtailed, even in the situation in which the reaction force is small. On the other hand, if the (combined) spring constant is relatively large, the (combined) elastic force of the springs greatly increases as the hammer retracts and the springs are compressed, effectively canceling out the reaction force from the fastening member. Therefore, occurrences of collisions of the hammer with a rearward member and occurrences of the springs reaching their solid length without the hammer retracting excessively are curtailed, even in the situation in which the reaction force is large. By making ratio Rm to be larger than 0.3, occurrences of abnormal impacts can be curtailed, even in situations in which a large reaction force or a small reaction force is applied. Thereby, occurrences of abnormal impacts can be curtailed even in situations in which the impact tool is employed to fasten fastening members having various sizes.

In one or more embodiments, the springs may include a first spring and a second spring. The inner diameter of the first spring may be larger than the inner diameter of the second spring. The spring constant of the first spring may be two times or more the spring constant of the second spring.

In the above-mentioned configuration, the spring constant of the second spring can be made relatively small. Therefore, it is possible to utilize a second spring, in which the wire of the second spring, which has a small inner diameter, can have a relatively small wire diameter and thus the winding count of the second spring can be relatively large. As a result, the solid length of the second spring need not be excessively long and a relative shortening of the lifespan of the second spring can be avoided.

In one or more embodiments, the set length, which is the length of the springs in the state in which the hammer is at the advancement limit position, may be 90% or more of the free length of the springs.

In the above-mentioned configuration, by making the set length of the springs relatively large, that is, by making the amount of deflection (compression) at the time of setting relatively small, the (combined) set load of the springs can effectively be made small. As a result, the hammer can be caused to retract to the distance required to avoid a collision between the hammer and the anvil in the axial direction, even in the situation in which the reaction force from the fastening member is small.

In one or more embodiments, the hammer, which retracts owing to the cam mechanism, becomes non-contacting with the anvil upon reaching a hammer separation position. The distance from the advancement limit position to the hammer separation position of the hammer may be 50% or less of the distance from the advancement limit position to a retraction limit position of the hammer.

In the above-mentioned configuration, the hammer can easily pass the separation position, even in the situation in which the reaction force from the fastening member is small and the amount of retraction is small. Therefore, occurrences of collisions between the hammer and the anvil in the axial direction can be curtailed because the distance from the advancement limit position to the hammer separation position is relatively small. Consequently, situations in which the hammer reaches the retraction limit and (undesirably) collides with another member can be curtailed, even in situations in which the reaction force from the fastening member is large, because the distance from the hammer separation position to the retraction limit position of the hammer is relatively large.

In one or more embodiments, the springs may have spring constants that are constant in a range from the advancement limit position of the hammer up to the retraction limit position of the hammer. It is noted that "springs having spring constants that are constant in a range up to the retraction limit position of the hammer" means that the spring constants of the springs optionally may vary in the vicinity of the solid length of the spring in the state in which the springs approach their solid length in the neighborhood of the retraction limit position of the hammer. That is, in the above-mentioned displacement range of the hammer, the springs are preferably not nonlinear springs, whose spring constants actively vary in accordance with the amount of deflection. Therefore, the springs can be considered to be at least substantially linear springs in the above-mentioned displacement range.

In the above-mentioned configuration, occurrences of abnormal impacts can be curtailed without employing special nonlinear springs as the springs. In addition, because the spring constants do not vary in accordance with the position of the hammer within the above-mentioned displacement range, the hammer can operate (move) smoothly when the hammer advances or retracts. However, as will be described below, the present teachings are also applicable, in some embodiments, to impact tools that utilize one or more nonlinear springs to bias the hammer forward in the axial direction.

In one or more embodiments, the maximum fastening torque of the impact tool may be 1,300 N·m or more and 3,000 N·m or less.

In the above-mentioned configuration of an impact tool capable of generating a relatively large impact force, occurrences of abnormal impacts can be curtailed and a deterioration in the user's impression of the impact tool caused by abnormal impacts can be avoided, even in situations in which the impact tool is used to perform fastening of a large-sized fastening member or a small-sized fastening member.

In one or more embodiments, the combined set load of the springs at the advancement limit position is preferably larger than 0 Newtons (N); that is the springs are disposed with a preset positive set load at the advancement limit position.

In the above-mentioned configuration, it is possible to avoid play (a gap between the springs and another member) at the mounting location of the springs due to dimensional tolerances. Thereby, movement of the springs can be prevented when the impact tool is not in use.

In one or more embodiments, an impact tool may comprise: a motor; a hammer, which is rotated by the motor; an anvil, which is impacted by the hammer in a rotational direction; a (at least one) spring, which biases the hammer forward toward the anvil; a cam mechanism, which alternately retracts the hammer while compressing the spring in response to application of the driving force of the motor and which permits the hammer to be advanced by the elastic force of the compressed spring; and a hammer-housing part, which houses the hammer. At a hammer separation position at which the hammer has retracted such that it becomes non-contacting with the anvil, the spring biases the hammer with a separation load. The value calculated by dividing the spring constant (N/mm) of the spring at the hammer separation position by the separation load (N) of the spring at the hammer separation position is preferably larger than 0.09. The value calculated by dividing the spring constant by the separation load is referred to as "ratio Rd" below.

In the above-mentioned configuration, the smaller that the separation load and the larger that the spring constant of the spring are, the larger that the value (ratio Rd) calculated by dividing the spring constant by the separation load is. If the separation load is relatively small, the amount of retraction of the hammer becomes large, even in the situation in which the reaction force from a fastening member (a bolt, a screw, or the like) is small at the time of impact. Therefore, occurrences of collisions of the hammer with the anvil in the axial direction owing to an insufficient amount of retraction can be curtailed, even in the situation in which the reaction force is small. On the other hand, if the spring constant is relatively large, the elastic force of the spring greatly increases as the hammer retracts and the spring is compressed, effectively canceling out the reaction force from the fastening member. Therefore, occurrences of collisions of the hammer with a rearward member and occurrences of the spring reaching its solid length without the hammer retracting excessively are curtailed, even in the situation in which the reaction force is large. By making ratio Rd to be larger than 0.09, occurrences of abnormal impacts can be curtailed, even in situations in which a large reaction force or a small reaction force is applied. Thereby, occurrences of abnormal impacts can be curtailed even in situations in which the impact tool is employed to fasten fastening members having various sizes.

In one or more embodiments, the (at least one) spring may include a first spring and a second spring, which are provided parallel to the hammer, preferably concentrically. The value calculated by dividing the total of the spring constants of the first spring and the second spring at the hammer separation position by the total of the separation loads of the first spring and the second spring at the hammer separation position may be larger than 0.09.

In the above-mentioned configuration, by providing the first spring and the second spring parallel (preferably, concentrically) to each other, overall ratio Rd of the springs can be easily made larger than 0.09. In addition, the wire diameters of the first spring and the second spring, individually, are small compared with embodiments having only a single spring; thus, the solid lengths of the springs can be shortened, and therefore design constraints on the springs can be relaxed.

As was noted above, the spring may include a first spring and a second spring, which are provided parallel to the hammer (preferably, concentrically). In such an embodiment, the value calculated by dividing the spring constant of the first spring at the hammer separation position by the separation load of the first spring at the hammer separation position may be larger than 0.10. Furthermore, the value calculated by dividing the spring constant of the second spring at the hammer separation position by the separation load of the second spring at the hammer separation position may be larger than 0.09. The value calculated by dividing the spring constant of the first spring at the hammer separation position by the separation load of the first spring at the hammer separation position and the value calculated by dividing the spring constant of the second spring at the hammer separation position by the separation load of the second spring at the hammer separation position are referred to below as "ratio RdA" and "ratio RdB," respectively.

In the above-mentioned configuration, by employing a structure in which the hammer is biased by a plurality of springs (i.e., the first spring and the second spring), and by making the spring ratios RdA, RdB to be larger than 0.10 and 0.09, respectively, occurrences of abnormal impacts can be curtailed while relaxing the design constraints on the springs.

In one or more embodiments, the inner diameter of the first spring may be larger than the inner diameter of the second spring. The spring constant of the first spring may be two times or more the spring constant of the second spring.

In the above-mentioned configuration, the spring constant of the second spring can be made relatively small. Therefore, it is again possible to utilize a second spring, in which the wire of the second spring, which has a small inner diameter, can have a relatively small wire diameter and thus the winding count of the second spring can be relatively large. As a result, the solid length of the second spring need not be excessively long and a relative shortening of the lifespan of the second spring can be avoided.

In one or more embodiments, a separation length, which is the length of the springs in the state in which the hammer is at the hammer separation position, may be 75% or more of the free (natural) length of the springs (i.e. the length of the springs at rest, in which no tension or compression force is being applied to the springs).

In the above-mentioned configuration, the separation load of the springs can effectively be made small by making the separation length of the springs large, that is, by making the amount of deflection (compression) of the springs at the hammer separation position relatively small. As a result, the amount of retraction required to avoid a collision between the hammer and the anvil in the axial direction can be easily ensured, even in the situation in which the reaction force from the fastening member is small.

In one or more embodiments, the distance from an (the) advancement limit position of the hammer to the hammer separation position may be 50% or less of the distance from the advancement limit position to a retraction limit position of the hammer.

In the above-mentioned configuration, because the distance from the advancement limit position to the hammer separation position is relatively small, the hammer can easily pass the hammer separation position (i.e. move (retract) rearwardly beyond the hammer separation position), even in the situation in which the reaction force from the fastening member is small and the amount of retraction is small. Therefore, occurrences of collisions between the hammer and the anvil in the axial direction can be curtailed. Moreover, because the distance from the hammer separation position to the retraction limit position is relatively large, situations in which the hammer reaches the retraction limit position and (undesirably) collides with another member can be curtailed, even in the situation in which the reaction force from the fastening member is large.

In one or more embodiments, the springs may have spring constants that are constant in the range from the advancement limit position of the hammer up to the retraction limit position of the hammer.

In the above-mentioned configuration, occurrences of abnormal impacts can be curtailed without employing special nonlinear springs as the springs. In addition, because the spring constants do not vary in accordance with the position of the hammer within the above-described range of movement of the hammer, the hammer can operate smoothly as the hammer advances or retracts during operation.

In one or more embodiments, the maximum fastening torque of the impact tool may be 1,300 N·m or more and 3,000 N·m or less.

In the above-mentioned configuration of an impact tool in which the hammer impact force is relatively large, occurrences of abnormal impacts can be curtailed and a deterioration in the user's impression of the impact tool caused by abnormal impacts can be avoided, even in situations in which the impact tool is used to perform fastening of a large-sized fastening member or a small-sized fastening member.

In one or more embodiments, the (combined) set load of the spring(s) is preferably larger than 0 Newtons (N) in the state in which the hammer is at the advancement limit position of the hammer. Preferably, the (combined) set load exceeds 0 N.

In the above-mentioned configuration, no play is created at the mounting location of the springs due to dimensional tolerances. Thereby, movement of the springs can be prevented when the impact tool is not in use.

In one or more embodiments, the impact tool may further comprise a speed-reducing-mechanism part, which is configured to transmit rotational force generated by the motor to the hammer at a lower rotational speed than the rotational speed of the rotor of the motor. The speed-reduction ratio of the speed-reducing-mechanism part may be 1/15 or more and 1/100 or less.

In the above-mentioned configuration, a large fastening torque can be generated by the speed-reducing-mechanism part.

In one or more embodiments, an impact tool may comprise: a motor; a hammer, which is rotated by the motor; an anvil, which is impacted by the hammer in a rotational direction; a (at least one) spring, which biases the hammer forward toward the anvil; a cam mechanism, which alternately retracts the hammer while compressing the spring in response to application of the driving force of the motor and permits the hammer to be advanced by the elastic force of the compressed spring; and a hammer-housing part, which houses the hammer. In the state in which the hammer is at an (the) advancement limit position of the hammer, the spring preferably biases the hammer with a set load. The value calculated by dividing the spring constant (N/mm) of the spring at the advancement limit position by the set load (N) of the spring at the advancement limit position may be larger than 0.3. The maximum fastening torque of the impact tool 1 may be 1,300 N·m or more.

In the above-mentioned configuration, the smaller that the set load and the larger that the spring constant of the spring are, the larger that the value (ratio Rm) calculated by dividing the spring constant by the set load is. If the set load is relatively small, the amount of retraction of the hammer becomes large even in the situation in which the reaction force from the fastening member (a bolt, a screw, or the like) is small at the time of impact. Therefore, occurrences of collisions of the hammer with the anvil in the axial direction owing to an insufficient amount of retraction can be curtailed, even in the situation in which the reaction force is small. On the other hand, if the spring constant is relatively large, the elastic force of the spring greatly increases as the hammer retracts and the spring is compressed, effectively canceling out the reaction force from the fastening member. Therefore, occurrences of collisions of the hammer with a rearward member and occurrences of the spring reaching its solid length without the hammer retracting excessively are curtailed, even in the situation in which the reaction force is large. By making ratio Rm to be larger than 0.3, occurrences of abnormal impacts can be curtailed, even in situations in which a large reaction force or a small reaction force is applied to the hammer during a fastening operation. Thereby, occurrences of abnormal impacts can be curtailed even in situations in which the impact tool is employed to fasten fastening members having various sizes.

Representative, non-limiting embodiments of the present teachings will be explained below, with reference to the drawings. In the embodiments, positional relationships among the parts are explained using the terms left, right, front, rear, up, and down. These terms indicate relative location or direction, wherein the center of an impact tool 1 is the reference. The impact tool 1 comprises a motor 6, which serves as a motive power source.

In the embodiment, the direction parallel to rotational axis AX of the motor 6 is called the axial direction where appropriate, the direction that goes around rotational axis AX is called the circumferential direction or the rotational direction where appropriate, and radial directions of rotational axis AX are called the radial direction where appropriate.

Rotational axis AX extends in a front-rear direction. One side in the axial direction is forward, and the other side in the axial direction is rearward. In addition, in the radial direction, a location that is proximate to or a direction that approaches rotational axis AX is called radially inward where appropriate, and a location that is distant from or a direction that leads away from rotational axis AX is called radially outward where appropriate.

Impact Tool

Figure 2:
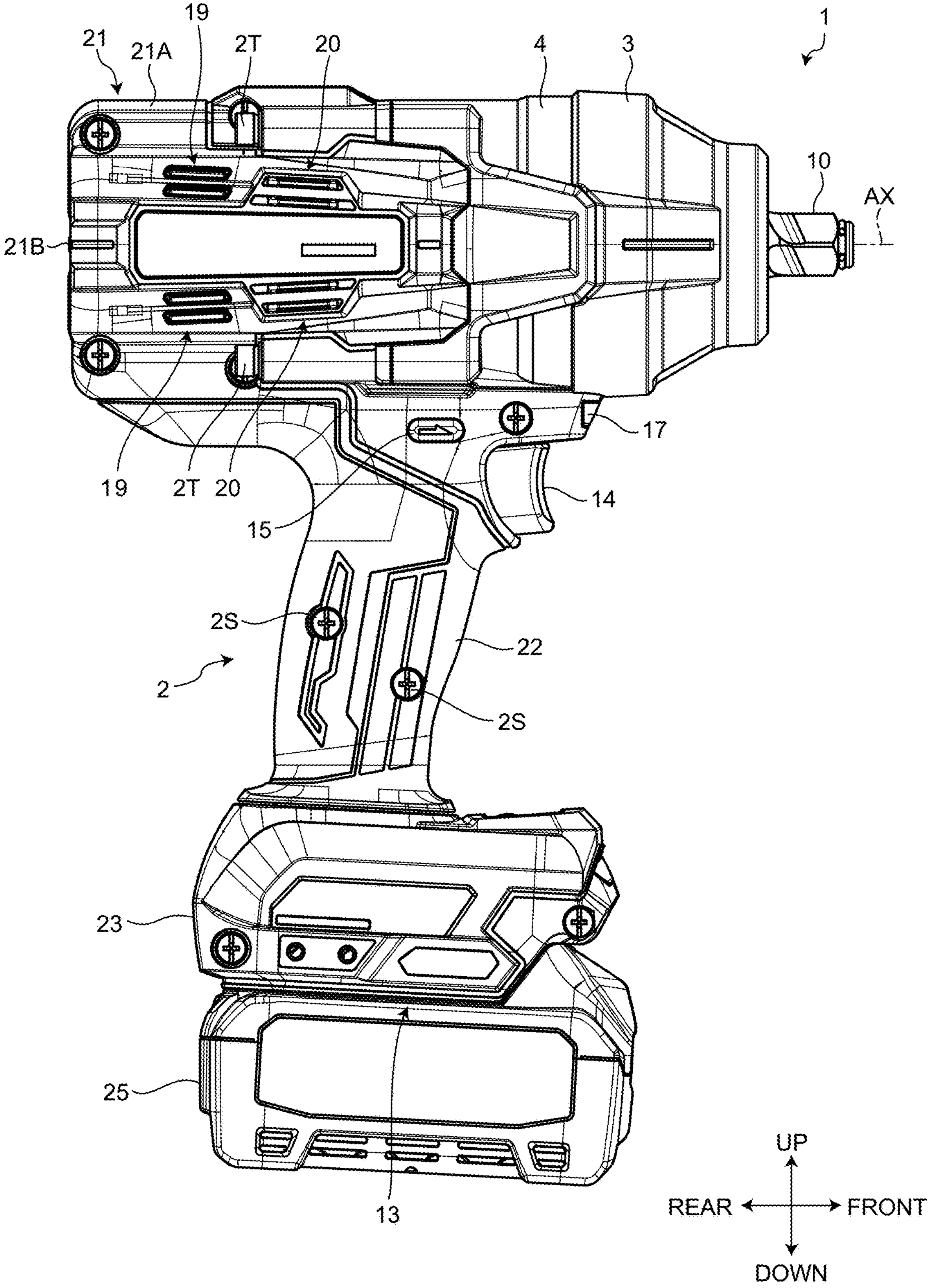
FIG. 2 is a side view that shows the impact tool according to the embodiment.
Figure 3:
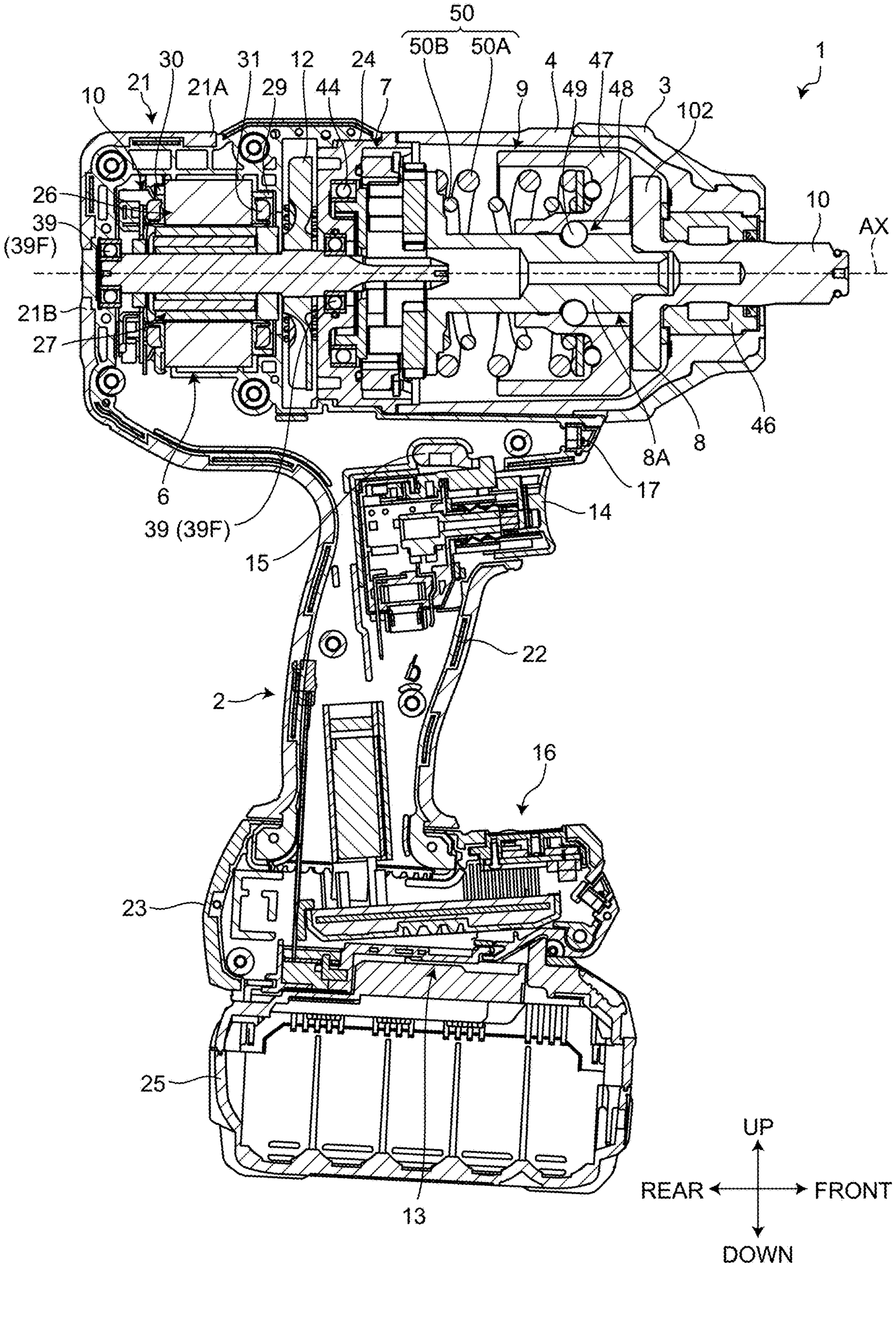
FIG. 3 is a longitudinal, cross-sectional view that shows the impact tool according to the embodiment.
Figure 4:
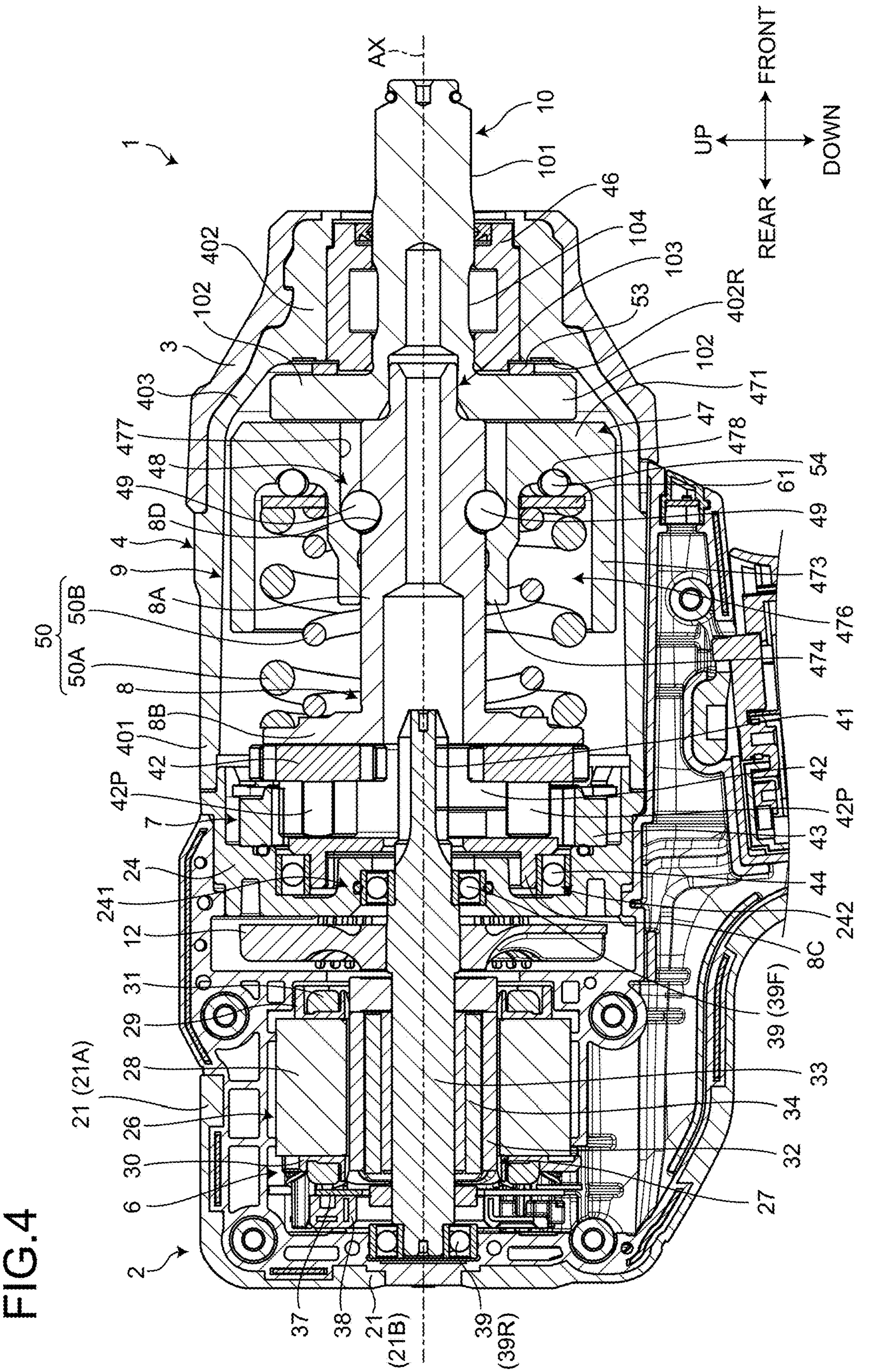
FIG. 4 is a longitudinal, cross-sectional view that shows an upper portion of the impact tool according to the embodiment.
Figure 5:
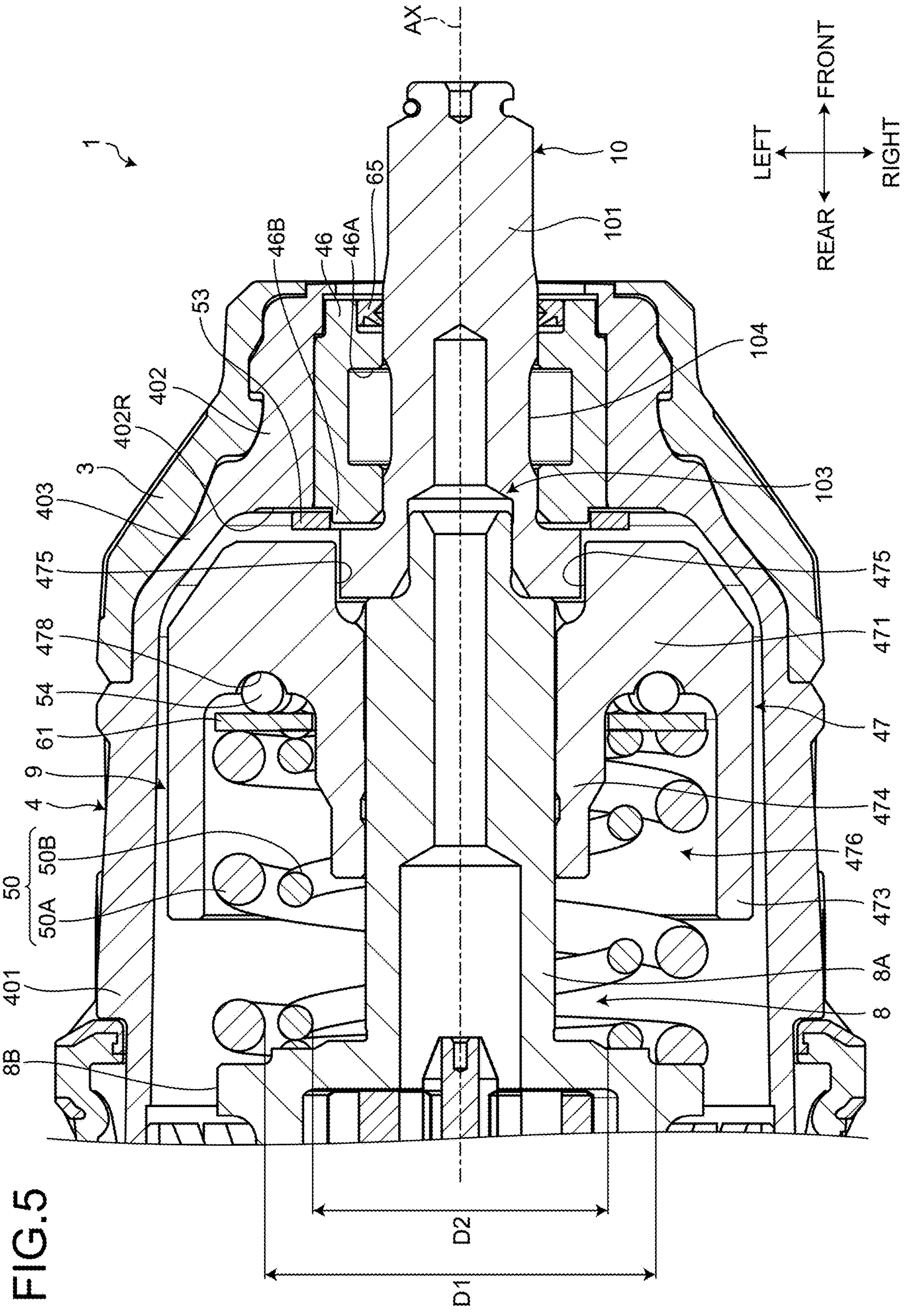
FIG. 5 is a transverse, cross-sectional view that shows the upper portion of the impact tool according to the embodiment.
Figure 6:
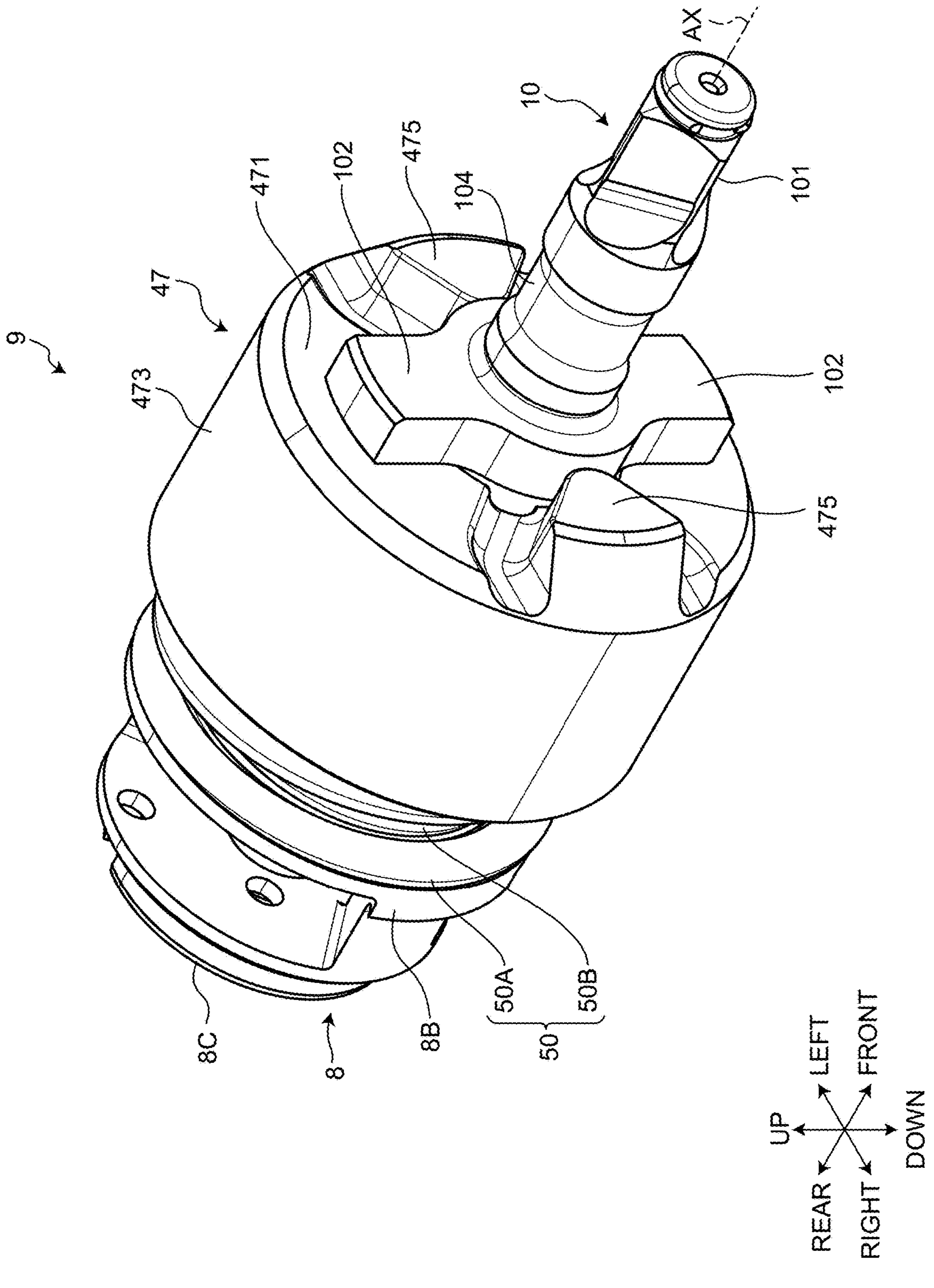
FIG. 6 is an oblique view, viewed from the right front, that shows an impact-mechanism part and an anvil according to the embodiment.

FIG. 1 is an oblique view, viewed from the right front, that shows the impact tool 1 according to one non-limiting embodiment of the present teachings. FIG. 2 is a side view that shows the impact tool 1 according to the embodiment. FIG. 3 is a longitudinal, cross-sectional view that shows the impact tool 1 according to the embodiment. FIG. 4 is a longitudinal, cross-sectional view that shows an upper portion of the impact tool 1 according to the embodiment. FIG. 5 is a transverse, cross-sectional view that shows the upper portion of the impact tool 1 according to the embodiment. FIG. 6 is an oblique view, viewed from the right front, that shows an impact-mechanism part 9 and an anvil 10 according to the embodiment.

In this embodiment, the impact tool 1 is an impact wrench. The impact tool 1 comprises a housing 2, a hammer-housing part 4, a cover 3, the motor 6, a speed-reducing-mechanism part 7, a spindle 8, the impact-mechanism part 9, the anvil 10, a fan 12, a battery-mounting part 13, a trigger lever 14, a forward/reverse-change lever 15, an operation-and-display part 16, and a light 17.

The housing 2 is made of a synthetic resin (polymer). In the embodiment, the housing 2 is made of nylon. The housing 2 comprises a left housing 2L and a right housing 2R, which is disposed rightward of the left housing 2L. The left housing 2L and the right housing 2R are fixed to each other by a plurality of screws 2S. The housing 2 is constituted from a pair of half housings.

The housing 2 comprises a motor-housing part 21, a grip part 22, and a battery-holding part 23.

The motor-housing part 21 houses the motor 6. The motor-housing part 21 and the hammer-housing part 4 are fixed by a plurality of screws 2T.

The grip part 22 is configured to be gripped by the user. The grip part 22 extends downward from the motor-housing part 21. The trigger lever 14 is provided on an upper portion of the grip part 22.

The battery-holding part 23 holds a battery pack 25 via the battery-mounting part 13. The battery-holding part 23 is connected to a lower-end portion of the grip part 22. The dimensions of the outer shape of the battery-holding part 23 are larger than the dimensions of the outer shape of the grip part 22 in the front-rear direction and in the left-right direction.

The motor-housing part 21 has air-intake ports 19 and air-exhaust ports 20. The air-exhaust ports 20 are provided more forward than the air-intake ports 19. Air outside of the housing 2 flows into the interior space of the housing 2 via the air-intake ports 19. Air in the interior space of the housing 2 flows out to the exterior of the housing 2 via the air-exhaust ports 20.

The hammer-housing part 4 houses the speed-reducing-mechanism part 7, the spindle 8, the impact-mechanism part 9, and at least a portion of the anvil 10. At least a portion of the speed-reducing-mechanism part 7 is disposed in the interior of a bearing box 24. The speed-reducing-mechanism part 7 comprises a plurality of gears.

The hammer-housing part 4 is made of metal. In this embodiment, the hammer-housing part 4 is preferably made of aluminum. The hammer-housing part 4 has a tube shape. The hammer-housing part 4 is connected to a front portion of the motor-housing part 21. The bearing box 24 is fixed to a rear portion of the hammer-housing part 4. The front portion of the bearing box 24 is attached to the rear portion of the hammer-housing part 4, thereby fixing the bearing box 24 and the hammer-housing part 4 to each other.

The cover 3 is disposed to cover at least a portion of the outer surface of the hammer-housing part 4.

The motor 6 is the motive power source of the impact tool 1. The motor 6 is an inner-rotor-type brushless motor. The motor 6 comprises a stator 26 and a rotor 27. The stator 26 is supported in the motor-housing part 21. At least a portion of the rotor 27 is disposed in the interior of the stator 26. The rotor 27 rotates relative to the stator 26. The rotor 27 rotates about rotational axis AX, which extends in the front-rear direction.

The speed-reducing-mechanism part 7 operably couples the rotor 27 to the spindle 8. Therefore, the speed-reducing-mechanism part 7 transmits the rotational energy of the rotor 27 to the spindle 8. The speed-reducing-mechanism part 7 causes the spindle 8 to rotate at a rotational speed that is lower than the rotational speed of the rotor 27, but at a higher torque. The rotation of the spindle 8 is transmitted to a hammer 47 via a cam mechanism 48. Thereby, the speed-reducing-mechanism part 7 transmits the rotational force generated by the motor 6 to the hammer 47 at a lower rotational speed than the rotational speed of the rotor 27 of the motor 6. The speed-reducing-mechanism part 7 is disposed forward of the motor 6. The speed-reducing-mechanism part 7 comprises a planetary-gear mechanism, which comprises a plurality of gears as was noted above. The gears of the speed-reducing-mechanism part 7 are driven by the rotor 27 as will be explained below. The speed-reduction ratio of the speed-reducing-mechanism part 7 is, for example, 1/15 or more. The speed-reduction ratio of the speed-reducing-mechanism part 7 is, for example, 1/100 or less.

The spindle 8 is rotated by the rotational force of the rotor 27 transmitted thereto by the speed-reducing-mechanism part 7. The spindle 8 is disposed forward of at least a portion of the motor 6. The spindle 8 is disposed forward of the stator 26. At least a portion of the spindle 8 is disposed forward of the rotor 27. At least a portion of the spindle 8 is disposed forward of the speed-reducing-mechanism part 7. The spindle 8 is disposed rearward of the anvil 10.

The impact-mechanism part 9 impacts the anvil 10 in the rotational direction using the rotational force of the spindle 8, which is rotated by the motor 6 and the speed-reducing mechanism 7. Thus, the rotational force of the motor 6 is transmitted to the impact-mechanism part 9 via the speed-reducing-mechanism part 7 and the spindle 8.

The anvil 10 is an output shaft of the impact tool 1, which is rotated by the rotational force of the rotor 27. The anvil 10 is impacted in the rotational direction by the impact-mechanism part 9. The anvil 10 is disposed forward of the motor 6. A socket, which is one type of tool accessory that can be utilized by the impact tool 1, is mountable on a front-end portion of the anvil 10. The front-end portion of the anvil 10 has a square-column shape. The anvil 10 is disposed forward of at least a portion of the spindle 8.

The fan 12 generates an airflow for cooling the motor 6. The fan 12 is disposed forward of the stator 26 of the motor 6. The fan 12 is fixed to at least a portion of the rotor 27. By rotating the fan 12, air outside of the housing 2 flows into the interior space of the housing 2 via the air-intake ports 19. Air that has flowed into the interior space of the housing 2 flows through the interior space of the housing 2 and thereby cools the motor 6. Air that has flowed through the interior space of the housing 2 subsequently flows out to the exterior of the housing 2 via the air-exhaust ports 20.

The battery-mounting part 13 is connected, physically and electrically, to the battery pack 25. The battery pack 25 is mounted on the battery-mounting part 13. The battery pack 25 is detachable from the battery-mounting part 13. The battery-mounting part 13 is disposed at a lower portion of the battery-holding part 23. The battery pack 25 is mounted on the battery-mounting part 13 by being inserted (slid) into the battery-mounting part 13 from forward of the battery-holding part 23. The battery pack 25 is removed from the battery-mounting part 13 by being pulled forward from the battery-mounting part 13. The battery pack 25 comprises secondary batteries. In the embodiment, the battery pack 25 comprises rechargeable lithium-ion batteries. When mounted on the battery-mounting part 13, the battery pack 25 can supply electric power to the impact tool 1. The motor 6 is driven using the electric power supplied from the battery pack 25.

The trigger lever 14 is manipulated (pulled) by the user to start the motor 6. The motor 6 switches between being driven and being stopped by manipulating the trigger lever 14. The trigger lever 14 is provided on the grip part 22.

The forward/reverse-change lever 15 is manipulated (slid) by the user. By manipulating the forward/reverse-change lever 15, the rotational direction of the motor 6 switches from one of the forward-rotational direction and the reverse-rotational direction to the other. By switching the rotational direction of the motor 6, the rotational direction of the spindle 8 can be switched. The forward/reverse-change lever 15 is provided at an upper portion of the grip part 22.

The operation-and-display part 16 comprises a plurality of manipulatable buttons 16A and an indicator display device 16B. When the user presses one or more of the manipulatable buttons 16A, the action mode of the motor 6 is switched. The indicator display device 16B comprises a plurality of light-emitting parts, e.g., LEDs. The indicator display device 16B displays the action mode of the motor 6 by changing a light-ON pattern (lighting pattern) for the plurality of light-emitting parts. The operation-and-display part 16 is provided on the battery-holding part 23. The operation-and-display part 16 is provided on an upper surface of the battery-holding part 23 on a forward side of the grip part 22.

The light 17 emits illumination light. The light 17 illuminates the anvil 10 and the periphery of the anvil 10 with the illumination light. The light 17 illuminates forward of the anvil 10 with the illumination light. In addition, the light 17 illuminates the tool accessory that is mounted in the anvil 10 and the periphery of the tool accessory with the illumination light. The light 17 is disposed upward of the trigger lever 14.

The hammer-housing part 4 has a first tube portion 401, a second tube portion 402, and a connecting portion 403. The first tube portion 401 is disposed around the impact-mechanism part 9. The second tube portion 402 is disposed forward of the first tube portion 401. The outer diameter of the second tube portion 402 is smaller than the outer diameter of the first tube portion 401. The connecting portion 403 is disposed to connect a front portion of the first tube portion 401 and a rear portion of the second tube portion 402. The inner diameter of second tube portion 402 is smaller than the inner diameter of the first tube portion 401.

The motor 6 comprises the stator 26 and the rotor 27. The stator 26 comprises a stator core 28, a front insulator 29, a rear insulator 30, and coils 31. The rotor 27 rotates around rotational axis AX. The rotor 27 comprises a rotor core 32, a rotor shaft 33, and rotor magnets 34.

The stator core 28 is disposed radially outward of the rotor 27; i.e., the stator core 28 radially surrounds the rotor 27. The stator core 28 comprises a plurality of laminated steel sheets. The steel sheets are made of a metal in which iron is the main component. The stator core 28 has a tube shape. The stator core 28 comprises teeth that respectively support the coils 31.

The front insulator 29 is provided on a front portion of the stator core 28. The rear insulator 30 is provided on a rear portion of the stator core 28. The front insulator 29 and the rear insulator 30 are each an electrically insulating member that is made of a synthetic resin (polymer). The front insulator 29 is disposed to cover a portion of a first surface of each of the teeth. The rear insulator 30 is disposed to cover a portion of a second surface of each of the teeth that is opposite of the first surface in the axial direction.

The coils 31 are mounted (wound) on the stator core 28 via (around) the front insulator 29 and the rear insulator 30 and the respective teeth. That is, the coils 31 are respectively disposed (wound) around the teeth of the stator core 28 via (over) the front insulator 29 and the rear insulator 30. The coils 31 and the stator core 28 are electrically insulated from each other by the front insulator 29 and the rear insulator 30. Diametrically opposite ones of the coils 31 are respectively electrically connected via a busbar unit (short-circuiting device) 38, e.g., in a delta connection or a Wye connection.

The rotor core 32 and the rotor shaft 33 are each made of steel. The rotor shaft 33 is disposed in the interior of the rotor core 32. The rotor core 32 and the rotor shaft 33 are fixed to each other. A front-end portion of the rotor shaft 33 protrudes forward of a front-end surface of the rotor core 32, and a rear-end portion of the rotor shaft 33 protrudes rearward of a rear-end surface of the rotor core 32.

The rotor magnets 34 are fixed to the rotor core 32. The rotor magnets 34 are disposed in the interior of the rotor core 32.

A sensor board 37 is mounted on the rear insulator 30. The sensor board 37 comprises a disk-shaped circuit board, in which a hole is provided at the center, and rotation-detection devices, which are supported on the circuit board. At least a portion of the sensor board 37 opposes the rotor magnets 34. The rotation-detection devices detect the location of the rotor 27 in the rotational direction by detecting the location of the rotor magnets 34 of the rotor 27.

The rotor shaft 33 is supported in rotor bearings 39 in a rotatable manner. The rotor bearings 39 include a front-side rotor bearing 39F, which supports the front-end portion of the rotor shaft 33 in a rotatable manner, and a rear-side rotor bearing 39R, which supports the rear-end portion of the rotor shaft 33 in a rotatable manner.

The front-side rotor bearing 39F is held in the bearing box 24. The bearing box 24 has a recessed portion 241, which is recessed forward from a rear surface of the bearing box 24. The front-side rotor bearing 39F is disposed in the recessed portion 241. The rear-side rotor bearing 39R is held by a rear-surface portion 21B of the motor-housing part 21. The front-end portion of the rotor shaft 33 is disposed in an interior space of the hammer-housing part 4 through an opening in the bearing box 24.

The fan 12 is fixed to a front portion of the rotor shaft 33. The fan 12 is disposed between the front-side rotor bearing 39F and the stator 26. The fan 12 is rotated by rotation of the rotor shaft 33. Thus, when the rotor shaft 33 rotates, the fan 12 rotates together with the rotor shaft 33.

A pinion gear 41 is formed at the front-end portion of the rotor shaft 33. The pinion gear 41 is operably coupled to at least a portion of the speed-reducing-mechanism part 7. Thus, the rotor shaft 33 is operably coupled to the speed-reducing-mechanism part 7 via the pinion gear 41.

The speed-reducing-mechanism part 7 comprises planet gears 42, which are disposed (radially) around the pinion gear 41, and an internal gear 43, which is disposed (radially) around the planet gears 42. The pinion gear 41, the planet gears 42, and the internal gear 43 are each housed in the hammer-housing part 4. Each of planet gears 42 meshes with the pinion gear 41. The planet gears 42 are supported in a rotatable manner by the spindle 8 via respective pins 42P. The spindle 8 is rotated by the planet gears 42. The internal gear 43 has inner teeth, which mesh with the planet gears 42. The internal gear 43 is fixed to the hammer-housing part 4. The internal gear 43 is non-rotatable relative to the hammer-housing part 4 in normal operation.

When the rotor shaft 33 is rotated by driving (energizing) the motor 6, the pinion gear 41 rotates, and the planet gears 42 are thereby caused to revolve around the pinion gear 41. The planet gears 42 revolve while meshing with the inner teeth of the internal gear 43. Owing to the revolving of the planet gears 42, the spindle 8, which is connected to the planet gears 42 via the pins 42P, rotates at a rotational speed that is lower than the rotational speed of the rotor shaft 33.

Thus, the spindle 8 is rotated by the rotational force of the motor 6. The spindle 8 transmits the rotational force of the motor 6 to the anvil 10 via the impact-mechanism part 9. The impact-mechanism part 9 is rotated by the rotational force of the rotor 27. The spindle 8 comprises a spindle-shaft portion 8A and a flange portion 8B, which is provided on a rear portion of the spindle-shaft portion 8A. The planet gears 42 are supported on the flange portion 8B in a rotatable manner via the respective pins 42P. The rotational axis of the spindle 8 and rotational axis AX of the motor 6 coincide with each other, i.e., are colinear. The spindle 8 rotates about rotational axis AX. The spindle 8 is supported by a spindle bearing 44 in a rotatable manner. A protruding portion 8C is provided on a rear-end portion of the spindle 8. The protruding portion 8C protrudes rearward from the flange portion 8B. The spindle bearing 44 surrounds the protruding portion 8C.

The bearing box 24 is disposed at least partly around the spindle 8. The spindle bearing 44 is held in the bearing box 24. The bearing box 24 has a recessed portion 242, which is recessed rearward from a front surface of the bearing box 24. The spindle bearing 44 is disposed in the recessed portion 242.

The impact-mechanism part 9 comprises the hammer 47, the cam mechanism 48, and springs 50. The impact-mechanism part 9, which comprises the hammer 47, the cam mechanism 48, and the springs 50, is housed in the first tube portion 401 of the hammer-housing part 4. The first tube portion 401 is disposed around the hammer 47.

The hammer 47 is disposed forward of the speed-reducing-mechanism part 7. The hammer 47 is disposed around the spindle-shaft portion 8A. The hammer 47 is supported by the spindle-shaft portion 8A. The anvil 10 is disposed forward of the hammer 47.

The hammer 47 is rotated by the motor 6. More specifically, the rotational force of the motor 6 is transmitted to the hammer 47 via the speed-reducing-mechanism part 7 and the spindle 8. The hammer 47 is rotatable, together with the spindle 8, using the rotational force of the spindle 8, which is rotated by the motor 6. The rotational axis of the hammer 47, the rotational axis of the spindle 8, and rotational axis AX of the motor 6 coincide with each other. The hammer 47 rotates about rotational axis AX.

The hammer 47 has a base portion 471, a rear-side ring portion 473, a support-ring portion 474, and hammer-projection portions 475.

The base portion 471 is disposed around the spindle-shaft portion 8A. The base portion 471 is ring shaped. The spindle-shaft portion 8A is disposed in the interior of the base portion 471.

The rear-side ring portion 473 protrudes rearward from an outer-circumferential portion of the base portion 471. The rear-side ring portion 473 is tube shaped. A rear-end portion of the rear-side ring portion 473 is disposed rearward of a rear-end portion of the support-ring portion 474.

The support-ring portion 474 protrudes rearward from an inner-circumferential portion of the base portion 471. The support-ring portion 474 is tube shaped. The support-ring portion 474 is disposed around the spindle-shaft portion 8A. The support-ring portion 474 is supported by the spindle-shaft portion 8A via the cam mechanism 48.

The hammer-projection portions 475 protrude forward from a front surface of the base portion 471. Front surfaces of the hammer-projection portions 475 are disposed forward of the front surface of the base portion 471. Two hammer-projection portions 475 are disposed in the circumferential direction. The two hammer-projection portions 475 are positioned at 180° relative to each other in the circumferential direction.

A recessed portion 476 is formed by a rear surface of the base portion 471, an inner-circumferential surface of the rear-side ring portion 473, and an outer-circumferential surface of the support-ring portion 474. The recessed portion 476 is provided in a rear portion of the hammer 47. The recessed portion 476 is formed so that it is recessed forward from a rear surface of the hammer 47.

The cam mechanism 48 converts the driving force of the motor 6, which is in the rotational direction, into an axial driving force of the hammer 47, i.e., the front-rear direction. Thus, when the motor 6 is driven (energized), the cam mechanism 48 causes the hammer 47 to retract while compressing the springs 50 in the axial. After the hammer 47 passes a hammer separation position (described below), the elastic force of the compressed springs 50 of the cam mechanism 48 causes the hammer 47 to rotate and advance (forward in the axial direction). The cam mechanism 48 comprises hammer balls 49, spindle grooves 8D, and hammer grooves 477, which mediate (facilitate) the forward-rearward movement of the hammer 47 in the axial direction.

The hammer balls 49 are made of a metal such as steel. The hammer balls 49 are disposed between the spindle-shaft portion 8A and the hammer 47. The hammer balls 49 are disposed between an outer-circumferential surface of the spindle-shaft portion 8A and an inner-circumferential surface of the hammer 47. The hammer balls 49 engage with the spindle 8 and the hammer 47. The hammer balls 49 transmit the driving force of the motor 6 to the hammer 47 via the spindle 8.

The spindle grooves 8D are provided in portions of the outer-circumferential surface of the spindle-shaft portion 8A. At least a portion of each of the hammer balls 49 is disposed in the corresponding spindle groove 8D. Each of the spindle grooves 8D is a recessed portion provided in a portion of the outer-circumferential surface of the spindle-shaft portion 8A. The spindle grooves 8D extend diagonally along the axial direction and the circumferential direction. Each of the hammer grooves 477 is provided in a portion of the inner-circumferential surface of the hammer 47. At least a portion of each of the hammer balls 49 is disposed in the corresponding hammer groove 477. Each of the hammer grooves 477 is a recessed portion provided in a portion of an inner-circumferential surface of the support-ring portion 474. The hammer balls 49 are disposed between the spindle grooves 8D and the hammer grooves 477. The hammer balls 49 can roll along the inner sides of the spindle grooves 8D and the inner sides of the hammer grooves 477. The hammer 47 is movable along the hammer balls 49. The spindle 8 and the hammer 47 can move relative to each other in both the axial direction and the rotational direction within a movable range defined by the spindle grooves 8D and the hammer grooves 477.

The springs 50 are disposed around the spindle-shaft portion 8A. The springs 50 bias the hammer 47 forward toward the anvil 10. The springs 50 are compression coil springs. Two or more of the springs 50 are provided, and the springs 50 are each disposed parallel to the hammer 47. In the present embodiment, the springs 50 comprise two springs: a first spring 50A and a second spring 50B, which are both compression coil springs. The first spring 50A and the second spring 50B are provided around the spindle-shaft portion 8A such that the spindle-shaft portion 8A passes through the interior of each spring. The first spring 50A and the second spring 50B are disposed concentrically around the spindle-shaft portion 8A. Inner diameter D1 of the first spring 50A is larger than inner diameter D2 of the second spring 50B. Inner diameter D1 of the first spring 50A is larger than the outer diameter of the second spring 50B. The second spring 50B is disposed radially inward of the first spring 50A. That is, the second spring 50B is disposed on the inner-diameter side of the first spring 50A parallel thereto. A front-end portion of the first spring 50A and a front-end portion of the second spring 50B are disposed in the interior of the recessed portion 476 of the hammer 47.

A rear-end portion of the first spring 50A and a rear-end portion of the second spring 50B are supported on a front surface of the flange portion 8B. The rear-end portion of the first spring 50A and the rear-end portion of the second spring 50B are in contact with the front surface of the flange portion 8B.

A washer 61 is disposed in the interior of the recessed portion 476 of the hammer 47. The front-end portion of the first spring 50A and the front-end portion of the second spring 50B are supported by the washer 61. The washer 61 is a ring-shaped (annular) member.

The washer 61 is disposed rearward of the base portion 471. The washer 61 supports the front-end portion of the first spring 50A and the front-end portion of the second spring 50B. The washer 61 is disposed between the rear-side ring portion 473 and the support-ring portion 474 in the radial direction. The washer 61 is disposed in the interior of the recessed portion 476. The washer 61 is supported by the hammer 47 via a plurality of support balls 54. In the state in which the hammer 47 is disposed most forward within the movable range of the hammer 47 in the front-rear direction, the support balls 54 are disposed forward of a rear-end portion of each of the hammer balls 49.

The support balls 54 are disposed in a support groove 478, which is provided in the hammer 47 in the interior of the recessed portion 476. In the present embodiment, the support groove 478 is provided in the rear surface of the base portion 471. The support groove 478 is provided in a ring shape so as to surround rotational axis AX. The support balls 54 are disposed (arranged) in the rotational direction inside the support groove 478. The support balls 54 support the washer 61.

The washer 61 is sandwiched between the springs 50 and the support balls 54 in the front-rear direction. The washer 61 is separate from the hammer 47 and the spindle 8.

The springs 50 (i.e., the first spring 50A and the second spring 50B) are mounted in the impact-mechanism part 9 in the state in which the springs 50 are pre-compressed (pre-loaded) relative to their natural length. In the state in which the hammer 47 is at (axial) position P1 (see FIG. 13), which is the advancement limit position (hereinafter, simply "advancement limit") of the hammer 47 in the axial direction, the springs 50 bias the hammer 47 with a prescribed (combined) set load. Position P1, which is the advancement limit, is the position of the hammer 47 in the state in which the hammer balls 49 are disposed at the end portion on the forward side of the corresponding spindle groove 8D. FIG. 4, FIG. 5, and FIG. 6 show the state in which the hammer 47 is at position P1, i.e., the advancement limit. The first spring 50A and the second spring 50B each continuously generate an elastic force that biases the hammer 47 forward in the axial direction.

The anvil 10 is impacted (hammered, struck) in the rotational direction by the hammer 47. The anvil 10 has an anvil-shaft portion 101, anvil-projection portions 102, and a recessed portion 103.

The anvil-shaft portion 101 extends in the axial direction (the front-rear direction). The anvil-shaft portion 101 has rotational axis AX. The anvil-shaft portion 101 is disposed forward of the spindle 8 and the hammer 47. At least a portion of the anvil-shaft portion 101 is disposed in an opening that is provided in a front-end portion of the hammer-housing part 4. The anvil-shaft portion 101 passes through the second tube portion 402. A front-end portion of the anvil-shaft portion 101 protrudes forward from the opening in the hammer-housing part 4. A socket, which is one exemplary type of tool accessory that can be used with the impact tool 1, is mountable on the front-end portion of the anvil-shaft portion 101.

The anvil-projection portions 102 project radially outward from a rear-end portion of the anvil-shaft portion 101. Two of the anvil-projection portion 102 are disposed in the circumferential direction. The two anvil-projection portion 102 are positioned at 180° relative to each other in the circumferential direction. The positions of the anvil-projection portions 102 and the positions of the hammer-projection portions 475 overlap in the front-rear direction in the state in which the hammer 47 is at position P1, i.e., the advancement limit. That is, the anvil-projection portions 102 and the hammer-projection portions 475 are aligned in the rotational direction. The anvil-projection portions 102 are respectively impacted in the rotational direction by the hammer-projection portions 475. A washer 53 is disposed between the front surface of the anvil-projection portions 102 and a rear surface 402R of the second tube portion 402. The washer 53 blocks (prevents) direct contact between the anvil-projection portions 102 and the second tube portion 402. A rear-end portion of the second tube portion 402 receives a load from the anvil-projection portions 102 via the washer 53.

The recessed portion 103 is recessed forward from a center portion of a rear surface of the anvil 10. A front-end portion of the spindle 8 is disposed in the recessed portion 103.

The base portion 471 is disposed rearward of the anvil-projection portions 102. The rear surfaces of the anvil-projection portions 102 and the front surface of the base portion 471 are spaced apart from each other.

The anvil 10 is supported in a rotatable manner by an anvil bearing 46. The rotational axis of the anvil 10, the rotational axis of the hammer 47, the rotational axis of the spindle 8, and rotational axis AX of the motor 6 coincide with each other. The anvil 10 rotates about rotational axis AX. The anvil bearing 46 is disposed around the anvil-shaft portion 101. A portion of the anvil bearing 46 is disposed in the interior of the second tube portion 402 of the hammer-housing part 4. The anvil bearing 46 is held in the second tube portion 402 of the hammer-housing part 4. The anvil bearing 46 is press-fitted into the second tube portion 402. The anvil bearing 46 is fixed to the hammer-housing part 4 in the interior of the hammer-housing part 4. The anvil bearing 46 supports the anvil-shaft portion 101 in a rotatable manner.

As shown in FIG. 5, the anvil bearing 46 has a recessed portion 46A, which is recessed radially outward, between the front-end portion and the rear-end portion, in the inner-circumferential surface. The recessed portion 46A is formed in a ring shape along the circumferential direction of the anvil bearing 46. The recessed portion 46A opposes a groove portion 104, which is formed in an outer-circumferential surface of the anvil-shaft portion 101. A lubricant is disposed in the space formed by the recessed portion 46A and the groove portion 104. A ring-shaped sealing member 65 is provided at a front-end portion of the inner-circumferential surface of the anvil bearing 46.

An outer-edge portion that is radially outward of a front surface of the washer 53 opposes a rear surface of the second tube portion 402. An inner-edge portion that is radially inward of the front surface of the washer 53 is disposed on a step portion 46B, which is formed on the outer circumference of a rear surface of the anvil bearing 46.

The hammer-projection portions 475 are configured to make contact with (strike, impact, hammer) the anvil-projection portions 102. In the state in which the hammer 47 and the anvil-projection portions 102 are in (continuous) contact with each other and the motor 6 is being driven (energized), the anvil 10 rotates together with the hammer 47 and the spindle 8. During bolt-fastening work, when the load that acts on the anvil 10 is small, the anvil 10 (continuously) rotates together with the hammer 47 and the spindle 8 while the motor 6 is being driven.

On the other hand, when the load that acts on the anvil 10 increases beyond a pre-determined limit, the anvil 10 will be intermittently impacted (struck, hammered) in the rotational direction by the hammer 47. For example, during bolt-fastening work, there are situations in which, when the load that acts on the anvil 10 becomes high, the anvil 10 can no longer be caused to be rotated by the driving force of the motor 6. When the anvil 10 can no longer be caused to rotate, the rotation of the anvil 10 and the hammer 47 temporarily stops. At this time, the spindle 8 and the hammer 47 can move relative to each other in the axial direction and the circumferential direction via the hammer balls 49. That is, even though the rotation of the hammer 47 temporarily stops, the spindle 8 continues to be rotated by the motive power output by the motor 6. As a result, the cam mechanism 48 causes the hammer 47 to retract (move rearward) while compressing the springs 50 in the axial direction. Accordingly, in the state in which the rotation of the hammer 47 has temporarily stopped but the spindle 8 continues to be rotated, the hammer balls 49 are caused to move rearward while being guided by the spindle grooves 8D and the hammer grooves 477. The hammer 47 receives a force from the hammer balls 49 in the retraction direction and thereby also moves rearward in the axial direction along with the hammer balls 49. That is, in the state in which the rotation of the anvil 10 has temporarily stopped, the hammer 47 moves rearward owing to the rotation of the spindle 8. Contact between the hammer 47 and the anvil-projection portions 102 is released when the hammer 47 moves (retracts) rearward in the axial direction beyond the hammer separation position.

Figure 7:
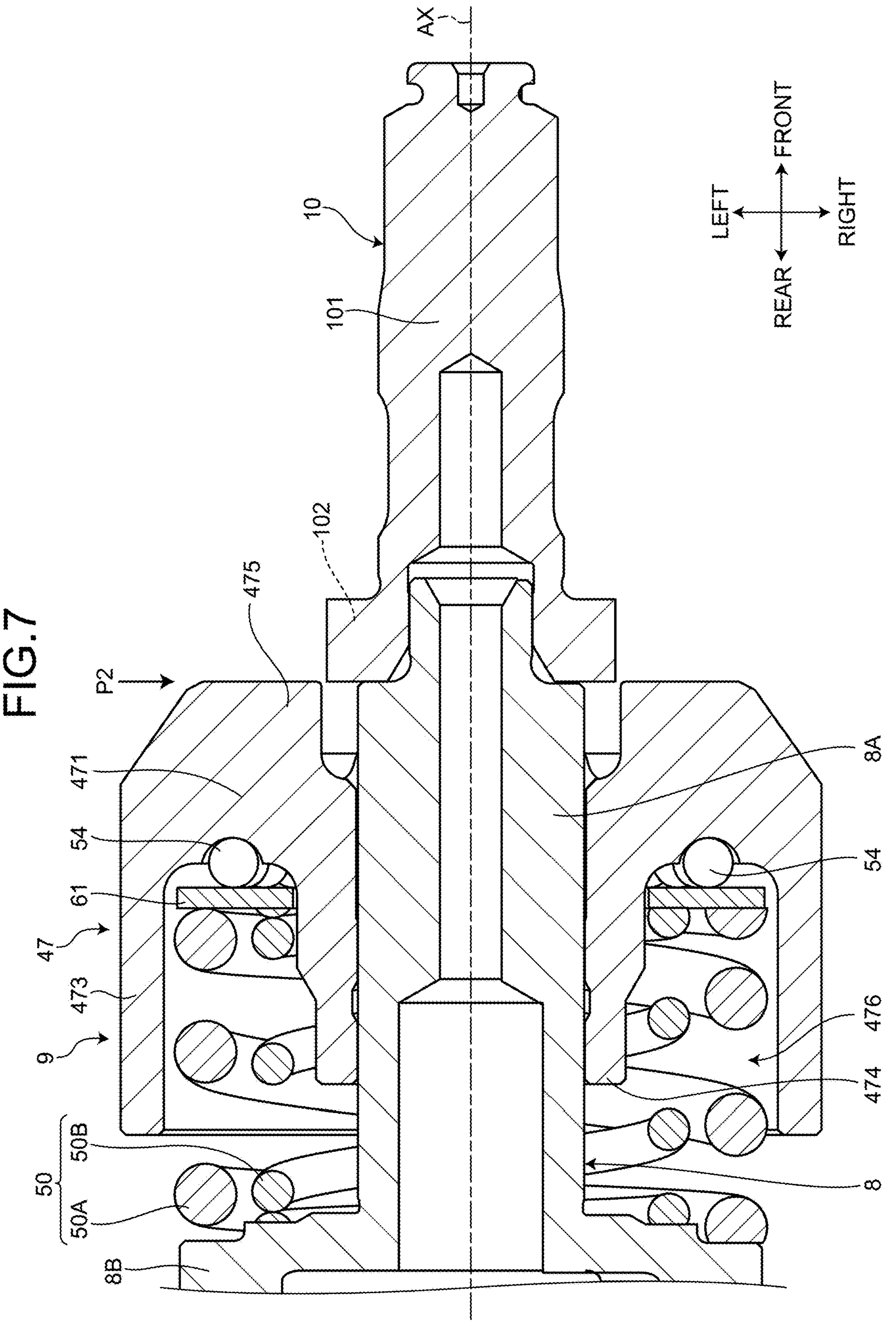
FIG. 7 is a transverse, cross-sectional view that shows the state in which a hammer is at a separation position.

More specifically, when the hammer 47 retracts to where the tips of the hammer-projection portions 475 go beyond the rear-end position of the anvil-projection portions 102 in the axial direction, the hammer-projection portions 475 and the anvil-projection portions 102 are no longer in contact in the rotational direction. In the present specification, the position, at which the hammer 47 has been retracted by the cam mechanism 48 so that the hammer 47 no longer contacts the anvil 10, is referred to as hammer separation position P2, hereinbelow simply "separation position P2". FIG. 7 is a transverse, cross-sectional view that shows the state in which the hammer 47 is at separation position P2. In the state in which the load acting on the anvil 10 is high, the rotation of the hammer 47 is temporarily stopped by the anvil 10 during the interval from when the hammer 47 is at the advancement limit until the hammer 47 is at separation position P2. At separation position P2 and more rearward than separation position P2 in the axial direction, because the hammer-projection portions 475 are disposed rearward of the anvil-projection portions 102, the hammer 47 becomes rotatable relative to the anvil 10.

When the hammer 47 moves rearward beyond separation position P2 in the axial direction, the hammer 47 will rotate relative to the spindle-shaft portion 8A. The washer 61 is separate from the hammer 47 and the spindle 8. Therefore, rotation of the hammer 47 is not obstructed by the washer 61. In addition, the hammer 47 can rotate smoothly owing to the rotation of the support balls 54, which are between the washer 61 and the hammer 47.

After the hammer 47 has moved rearward beyond separation position P2, the elastic force of the springs 50 then causes the hammer 47 to move axially forward while being rotated by the spindle 8. As the hammer 47 moves forward, the hammer balls 49 move forward while being guided by the spindle grooves 8D and the hammer grooves 477. When moving forward, the hammer 47 also receives a force in the rotational direction from the hammer balls 49. That is, the hammer 47 moves forward while rotating. When the hammer 47 moves forward while rotating, the hammer-projection portions 475 make contact with the anvil-projection portions 102 while rotating. Thereby, the anvil-projection portions 102 are impacted (struck, hammered) in the rotational direction by the hammer-projection portions 475. The motive power of the motor 6 and the inertial force of the hammer 47 both act on the anvil 10 at this time. Accordingly, the anvil 10 can be rotated around rotational axis AX with higher torque owing to the intermittent striking of the anvil 10 by the hammer 47.

It is noted that, when an individual hammer-projection portion 475 is considered, that hammer-projection portion 475 contacts one of the anvil-projection portions 102 as the hammer 47 retracts. After retraction beyond separation position P2, the hammer 47 moves forward while rotating, and thus the hammer-projection portion 475 first passes rearward of the one anvil-projection portion 102 in the rotational direction and then collides with (strikes, impacts, hammers) the other anvil-projection portion 102 in the rotational direction. Accordingly, the hammer 47 is rotated approximately 180° during a single hammering operation, which is from the retraction start of the hammer 47, the retraction stop, the advancement, and up until the collision of the hammer 47 with the anvil 10. The hammering operation is performed two times during each 360° rotation of the hammer 47.

Housing and Stator Support Structure

An impact occurs in the impact tool 1 at the time that the hammer 47 impacts (strikes, hammers) the anvil 10. The impulse at the time of impact is also transmitted rearward to the motor 6 via the spindle 8 and the speed-reducing-mechanism part 7. In the present embodiment, the housing 2 and the motor 6 have a structure that fixes the stator 26 in both the axial direction and the rotational direction.

Figure 8:
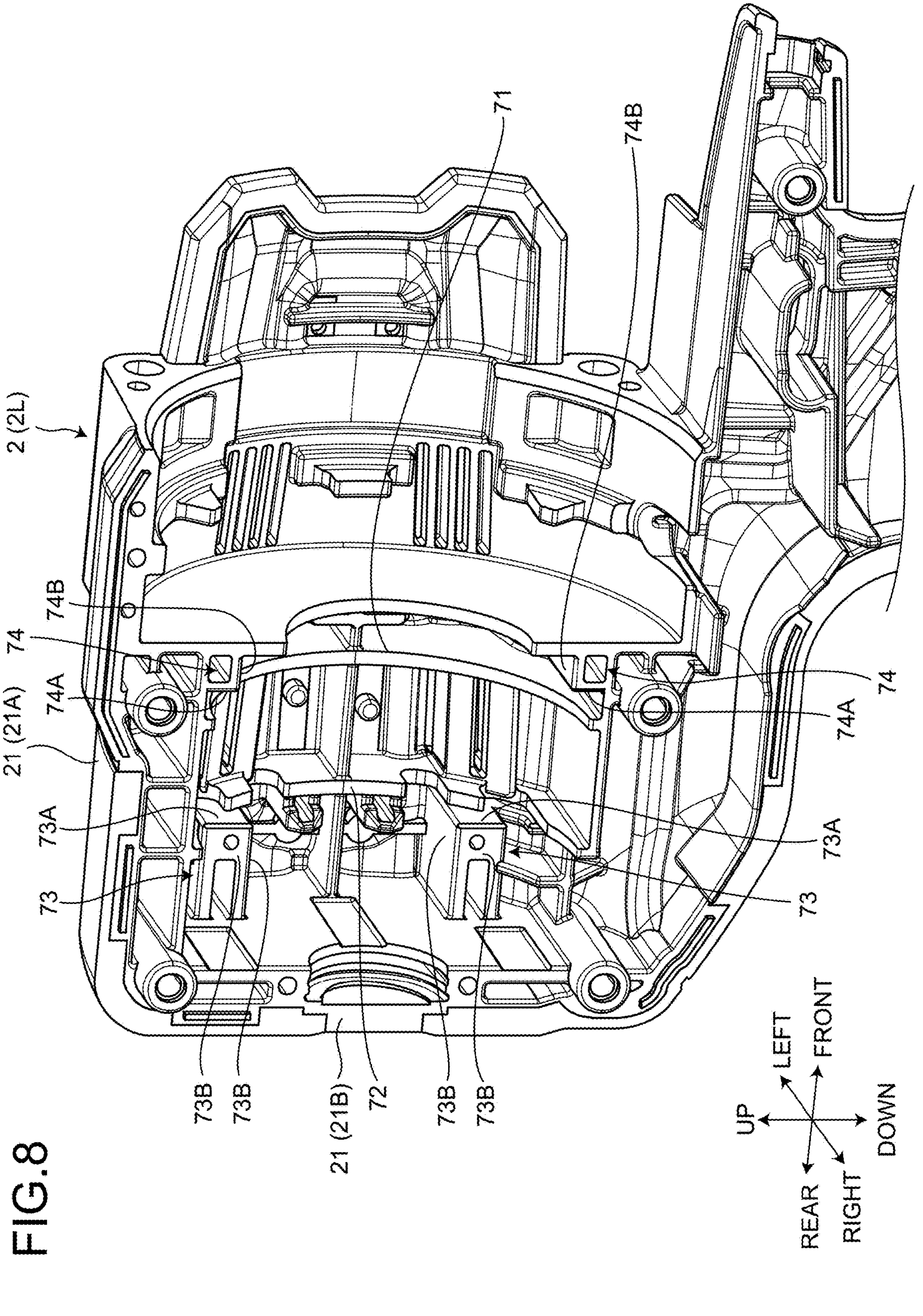
FIG. 8 is an oblique view that shows inner surfaces of a housing according to the embodiment.
Figure 9:
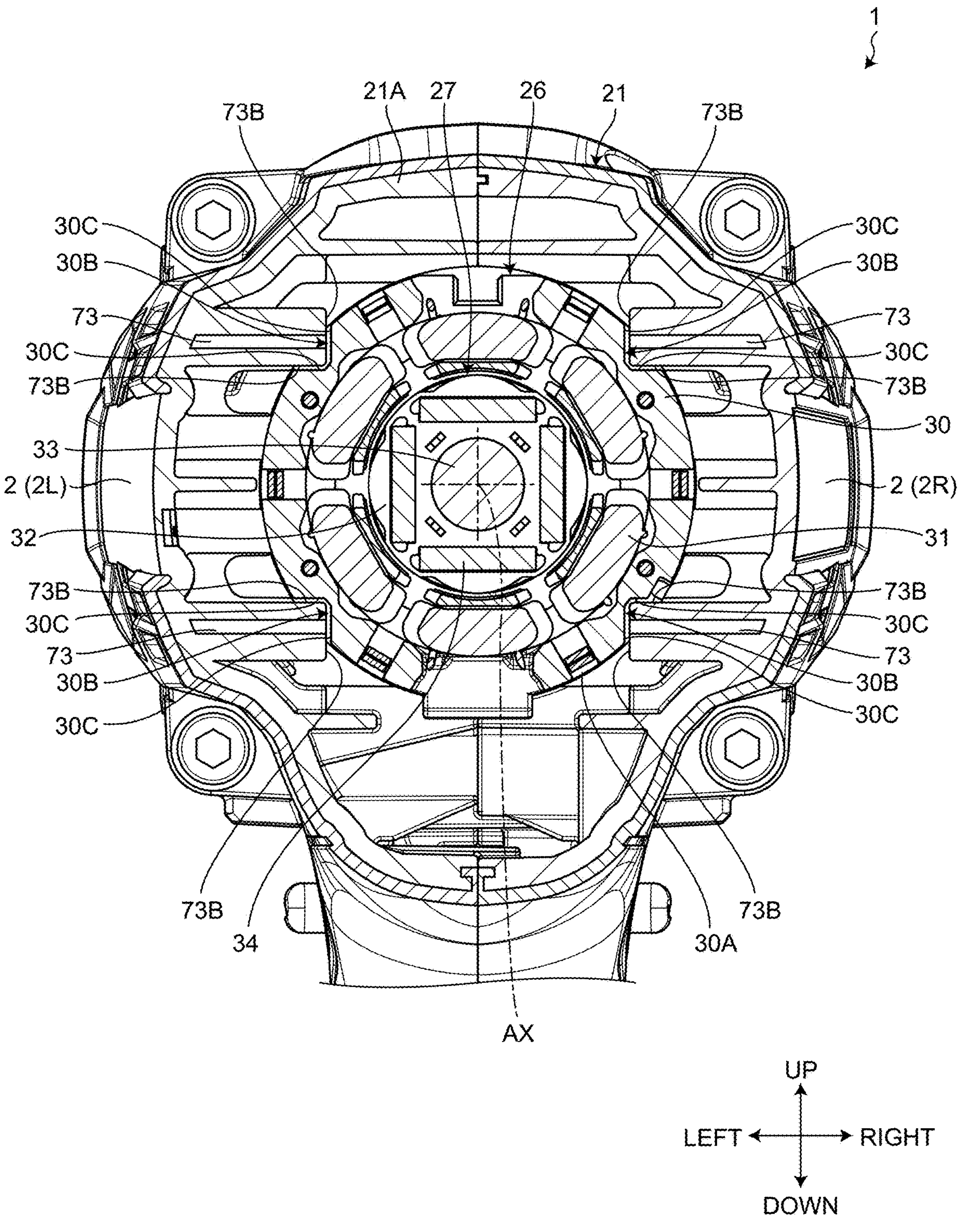
FIG. 9 is a cross-sectional view, viewed from the rear, of a cross section that passes through a rear insulator according to the embodiment.
Figure 10:
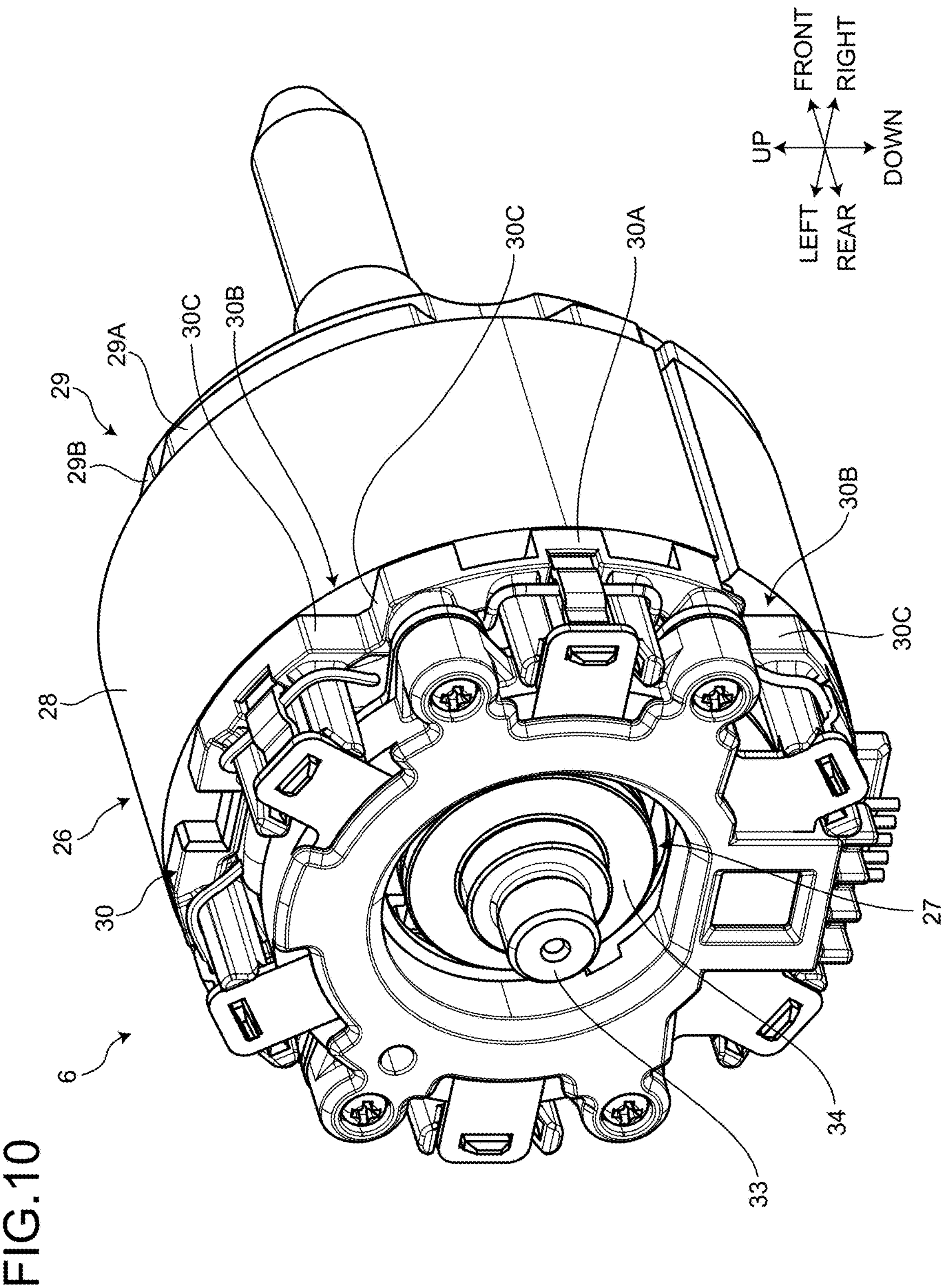
FIG. 10 is an oblique view, viewed from the right rear, that shows a motor according to the embodiment.
Figure 11:
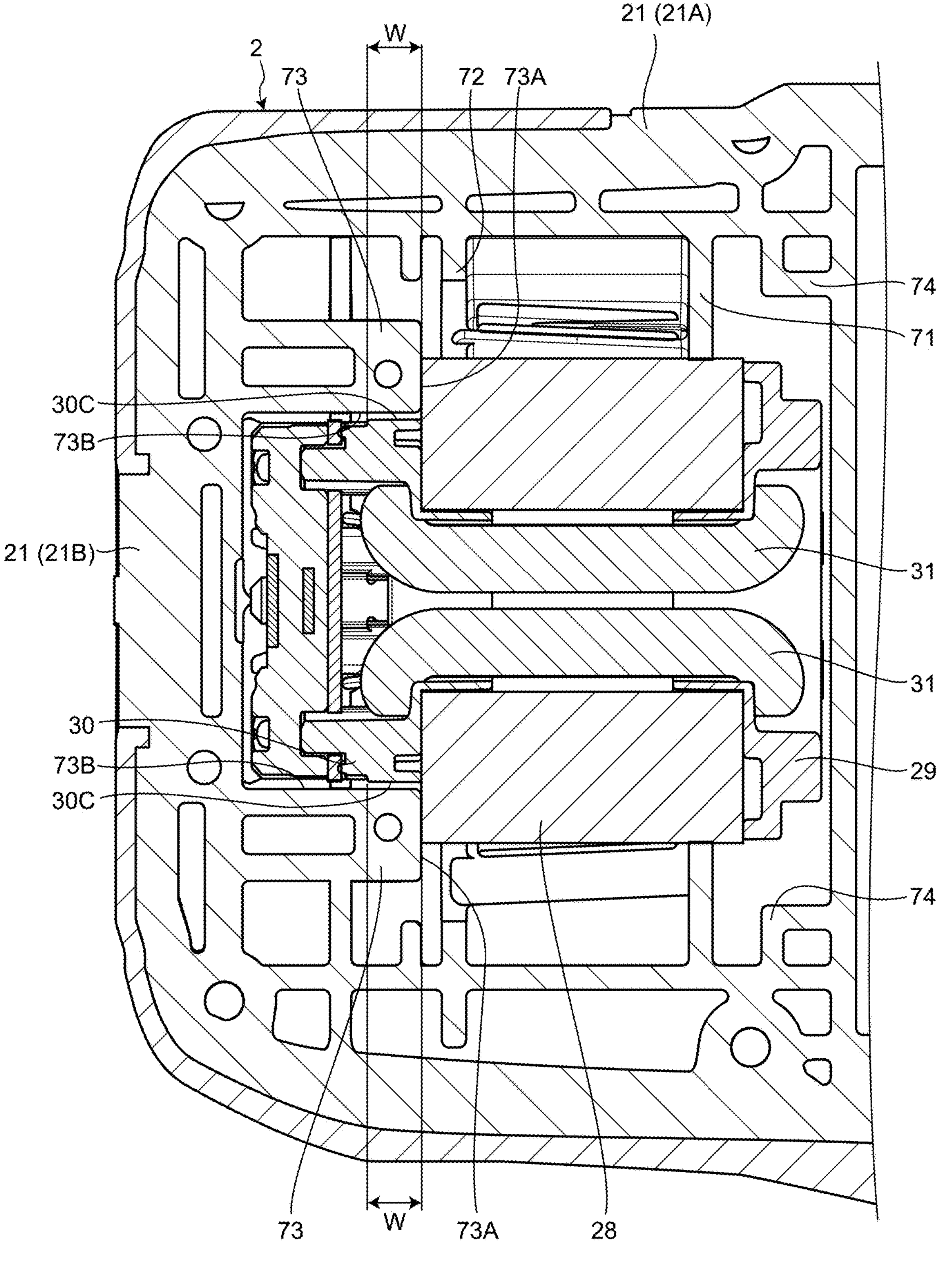
FIG. 11 is a longitudinal, cross-sectional view that shows column parts according to the embodiment.
Figure 12:
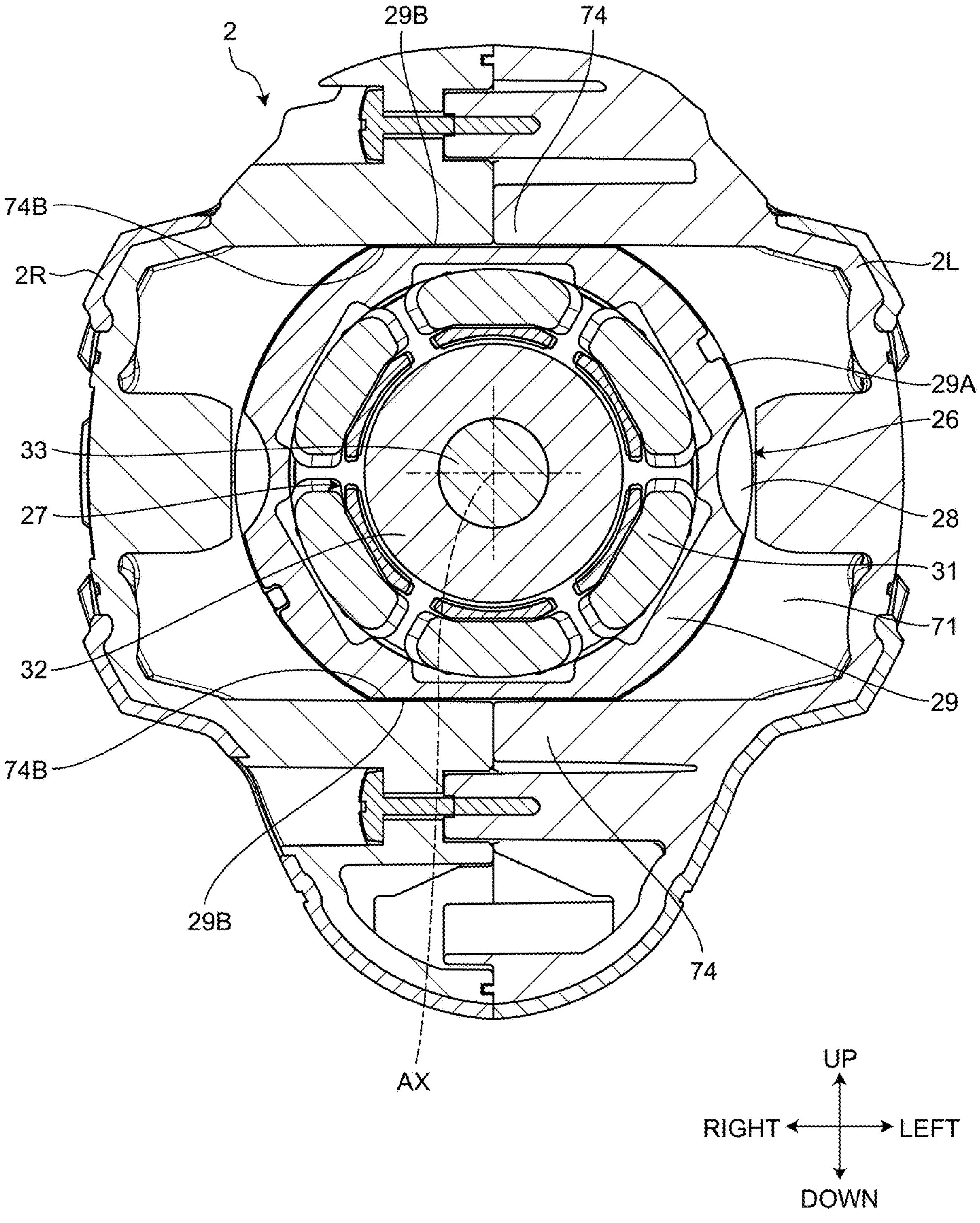
FIG. 12 is a cross-sectional view, viewed from the front, of a cross section that passes through a front insulator according to the embodiment.

FIG. 8 is an oblique view that shows inner surfaces of the housing according to the embodiment. The inner surfaces of the left housing 2L are shown in FIG. 8. FIG. 9 is a cross-sectional view, viewed from the rear, of a cross section that passes through the rear insulator 30 according to the embodiment. FIG. 10 is an oblique view, viewed from the right rear, that shows the motor 6 according to the embodiment. FIG. 11 is a longitudinal, cross-sectional view that shows column parts 73 according to the embodiment. FIG. 12 is a cross-sectional view, viewed from the front, of a cross section that passes through the front insulator 29 according to the embodiment.

The housing 2 comprises support-wall parts 71, 72 that extend along the outer-circumferential surface of the stator 26. The support-wall parts 71, 72 are provided on an interior surface of the motor-housing part 21. More specifically, the motor-housing part 21 has a circumferential surface portion 21A, which surrounds the motor 6, and the rear-surface portion 21B, which covers rearward of the motor 6. The support-wall parts 71, 72 protrude inward from the circumferential surface portion 21A of the motor-housing part 21 toward the outer-circumferential surface of the stator core 28. The outer-circumferential surface of the stator core 28 has a circular shape. The tip surfaces of the support-wall parts 71, 72 (the end surfaces on the inward side that faces the stator 26) are curved surfaces that curve in an arcuate shape along the outer-circumferential surface of the stator core 28. The tip surfaces of the support-wall parts 71, 72 make surface contact with the outer-circumferential surface of the stator core 28. The support-wall parts 71, 72 are disposed at locations separated from each other in the front-rear direction. The support-wall parts 71, 72 support a front portion and a rear portion, respectively, of the outer-circumferential surface of the stator core 28. Each of the support-wall parts 71, 72 has a left half and a right half formed in the left housing 2L and the right housing 2R, respectively, and the stator core 28 is sandwiched and supported thereby by joining the left housing 2L and the right housing 2R together.

The housing 2 also comprises the column parts 73, which oppose the rear surface of the stator 26. The column parts 73 are provided on an interior surface of the motor-housing part 21. More specifically, the column parts 73 protrude inward from the circumferential surface portion 21A of the motor-housing part 21 in the left-right direction. The column parts 73 are formed on the left housing 2L and the right housing 2R, respectively. The column parts 73 on the left housing 2L protrude from the inner-side surface of the left housing 2L toward the right side. The column parts 73 on the right housing 2R protrude from the inner-side surface of the right housing 2R toward the left side. The column parts 73 are provided on the upper portion and the lower portion, one on each portion, of the motor-housing part 21 in the left housing 2L. The column parts 73 are provided on the upper portion and the lower portion, one on each portion, of the motor-housing part 21 in the right housing 2R. In total, four of the column parts 73 are provided.

The column parts 73 extend rearward in the axial direction. The column parts 73 connect to the rear-surface portion 21B of the motor-housing part 21. Accordingly, the column parts 73 are connected to the circumferential surface portion 21A and the rear-surface portion 21B of the motor-housing part 21. Each of the column parts 73 has a first support surface 73A, which opposes a rear surface of the stator core 28 in the axial direction. Each of the column parts 73 has second support surfaces 73B that oppose the rear insulator 30, which is fixed to the stator core 28, in the axial direction. The first support surface 73A is the surface of the column part 73 that faces forward. The second support surfaces 73B are constituted by two surfaces: an end surface of the column part 73 in the left-right direction, and a surface of the column part 73 in the up-down direction that faces the center of the motor-housing part 21.

As shown in FIG. 10, the rear insulator 30 is disposed on the rear surface of the stator core 28. An outer-circumferential portion 30A of the rear insulator 30 is formed along the outer circumference of the stator core 28 in a substantially circular shape. The rear insulator 30 covers at least a majority of the rear surface of the stator core 28. Engaging-recessed portions 30B, which engage with the column parts 73, are provided (defined) in the outer-circumferential portion (outer circumference) 30A of the rear insulator 30. The engaging-recessed portions 30B are formed at four locations—the upper left, the lower left, the upper right, and the lower right—of the outer-circumferential portion 30A of the rear insulator 30 in correspondence with the four column parts 73.

The engaging-recessed portions 30B have a notch shape that is recessed radially inward from the outer-circumferential portion 30A of the rear insulator 30. Because they are recessed radially inward, the engaging-recessed portions 30B expose the rear surface of the stator core 28. The column parts 73 of the housing 2 are provided (arranged) so as to respectively fit into (mate with) the notch-shaped engaging-recessed portions 30B. Thereby, as shown in FIG. 11, the column parts 73, which are disposed in portions of the engaging-recessed portions 30B, oppose the rear surface of the stator core 28 in the axial direction. The first support surfaces 73A of the column parts 73 oppose the rear surface of the stator core 28 in the axial direction. Thereby, the column parts 73 support the rear surface of the stator core 28 in the axial direction. Because the first support surfaces 73A contact the rear surface of the stator core 28, the column parts 73 prevent mispositioning (undesirable movement) of the stator 26 rearward in the axial direction.

Because they extend up to the rear-surface portion 21B of the motor-housing part 21, the column parts 73 can transmit an axial-direction force from the rear surface of the stator core 28 to the rear-surface portion 21B. Consequently, the stiffness of the column parts 73 in the axial direction is increased compared with embodiments in which the column parts 73 are not connected to the rear-surface portion 21B. Thereby, the axial-direction impact load that accompanies the hammering operation and acts on the stator 26 can be supported effectively.

The engaging-recessed portions 30B have a V-shaped notch shape. The inner surfaces of the V shape of the engaging-recessed portions 30B are engaging surfaces 30C, which engage (mate) with the column parts 73 in the rotational direction in a form-fit manner. As shown in FIG. 9, the column parts 73, which are respectively disposed in the engaging-recessed portions 30B, oppose the V-shaped inner surfaces of the engaging-recessed portions 30B in the rotational direction. The second support surfaces 73B of the column parts 73 oppose the V-shaped engaging surfaces 30C in both rotational directions. Thereby, the column parts 73 support the rear insulator 30 in the rotational direction. Because the second support surfaces 73B respectively contact the engaging surfaces 30C of the engaging-recessed portions 30B of the rear insulator 30, the column parts 73 prevent mispositioning (undesirable movement) of the stator 26 in the rotational direction.

As shown in FIG. 11, the column parts 73 extend to the rear-surface portion 21B of the motor-housing part 21, thereby engaging, within a range of width W in the rotational direction, with the engaging surfaces 30C of the rear insulator 30. Because the contact-surface area (engagement area) with the engaging surfaces 30C of the rear insulator 30 can be made relatively large, the rotational-direction impact load that accompanies the hammering operation and acts on the stator 26 can be supported effectively.

As shown in FIG. 10, the front insulator 29 is disposed on a front surface of the stator core 28. Engagement-surface portions 29B, which respectively engage with support ribs 74, are provided on an outer-circumferential portion 29A of the front insulator 29. The front insulator 29 is formed along the outer circumference of the stator core 28 so as to be substantially a circular shape. The engagement-surface portions 29B are provided at an upper portion and a lower portion, respectively, of the outer-circumferential portion 29A of the front insulator 29. The engagement-surface portions 29B are straight, flat surfaces as if the upper portion and the lower portion, respectively, of the outer-circumferential portion 29A of the front insulator 29 were removed (cut away) along a straight line in the left-right direction. The engagement-surface portions 29B are formed on the left and the right, respectively, in a range that extends across the center (rotational axis AX) of the stator 26 in the left-right direction. The front surface of the stator core 28 is exposed at the locations where the engagement-surface portions 29B are formed (defined).

As shown in FIG. 8, the housing 2 comprises the support ribs 74, which oppose the front surface of the stator 26. The support ribs 74 are provided on an interior surface of the motor-housing part 21. More specifically, the support ribs 74 protrude inward from the circumferential surface portion 21A of the motor-housing part 21 in the left-right direction. The support ribs 74 are provided on the upper portion and the lower portion, one support rib 74 at each portion, of the motor-housing part 21. The support ribs 74 are respectively formed on the left housing 2L and the right housing 2R and, by assembling the left housing 2L and the right housing 2R, become straight-shaped ribs extending from one end (side) to the other end (side) of the motor-housing part 21 in the left-right direction.

The support ribs 74 have a first support surface 74A, which opposes the front surface of the stator core 28 in the axial direction. The first support surfaces 74A are the surfaces of the support ribs 74 that face rearward. The support ribs 74 have second support surfaces 74B, which oppose the engagement-surface portions 29B of the front insulator 29 in the rotational direction. The second support surfaces 74B are the surfaces of the motor-housing part 21 in the up-down direction that face the center. The second support surfaces 74B include the surface of the upper-side support rib 74 that is downward facing (the lower surface) and the surface of the lower-side support rib 74 that is upward facing (the upper surface).

The first support surfaces 74A of the support ribs 74 oppose the front surface of the stator core 28 in the axial direction. Thereby, the support ribs 74 support the front surface of the stator core 28 in the axial direction. Because the first support surfaces 74A contact the front surface of the stator core 28, the support ribs 74 prevent mispositioning (undesirable movement) of the stator 26 forward in the axial direction.

As shown in FIG. 12, the second support surfaces 74B of the support ribs 74 oppose the engagement-surface portions 29B of the front insulator 29 in the rotational direction. When a rotational force is applied to the stator 26 about rotational axis AX during a hammering operation owing to kickback from the hammer 47 striking the anvil 10 in the rotational direction, the engagement-surface portions 29B contact the second support surfaces 74B, thereby supporting the front insulator 29 in the rotational direction. Consequently, the support ribs 74 support (hold) the stator 26 in the rotational direction via the front insulator 29. The second support surfaces 74B and the engagement-surface portions 29B extend across the center (rotational axis AX) of the stator 26 in the left-right direction and oppose each other at both a left-side position and a right-side position. Therefore, the support ribs 74 block rotation (pivoting) of the stator 26 in both the forward-rotational direction (e.g., clockwise) and the reverse-rotational direction (e.g., counterclockwise) such that the kickback from the hammer operation does not adversely affect the motor 7.

It is noted that, in consideration of dimensional tolerances, the second support surface 74B of the support ribs 74 and the engagement-surface portions 29B of the front insulator 29 oppose each other slightly spaced apart. The gaps between the second support surfaces 74B and the engagement-surface portions 29B are larger than the gaps between the second support surfaces 73B of the column parts 73 and the engaging surfaces 30C of the rear insulator 30. Consequently, support (holding) of the stator 26 in the rotational direction is primarily realized by the column parts 73. However, if a large torque acts on the stator 26 that cannot be completely supported by the column parts 73, the support ribs 74 function to additionally support (hold) the stator 26 in the rotational direction.

Design of Springs

Next, a presently preferred design of the springs 50 according to the embodiment will be explained. First, the behavior (movement) of the hammer 47 during a hammering operation will be explained.

Figure 13A:
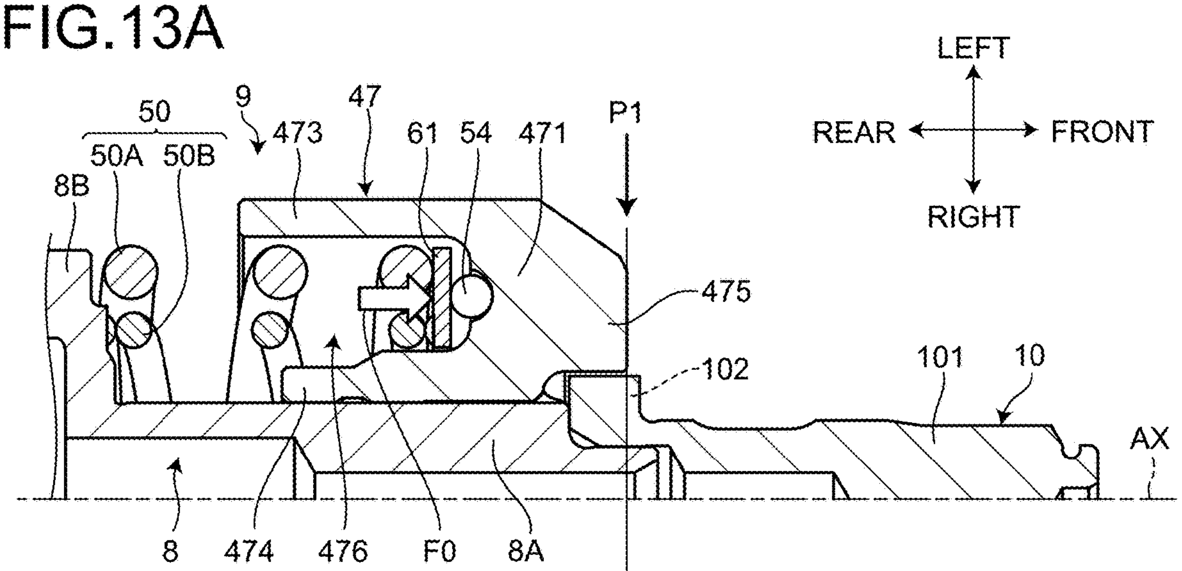
FIGS. 13A-13C show explanatory diagrams for explaining an operation of the hammer according to the embodiment.
Figure 13B:
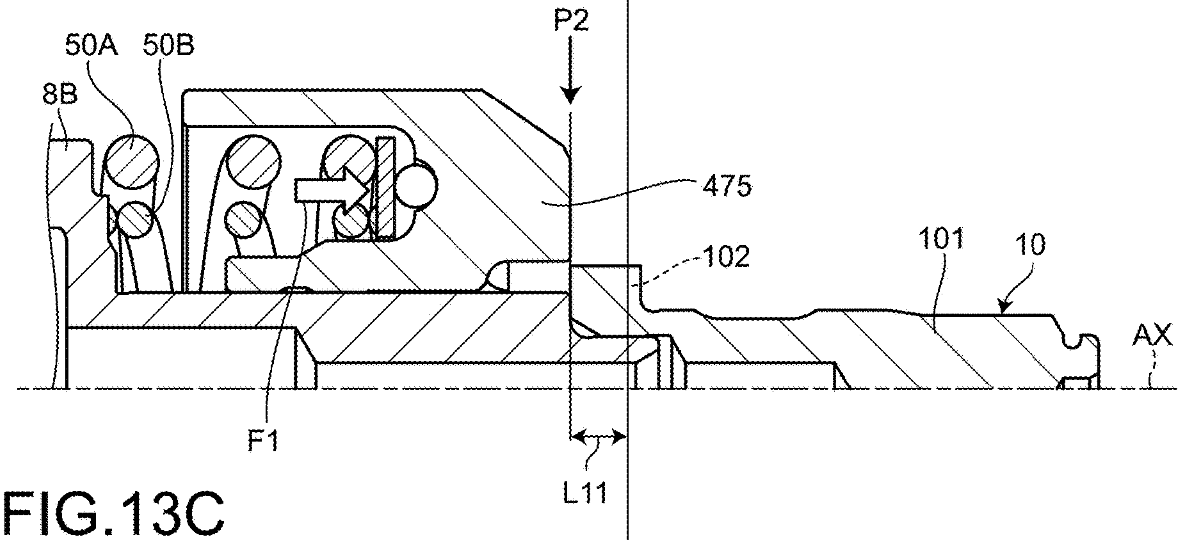
Figure 13C:
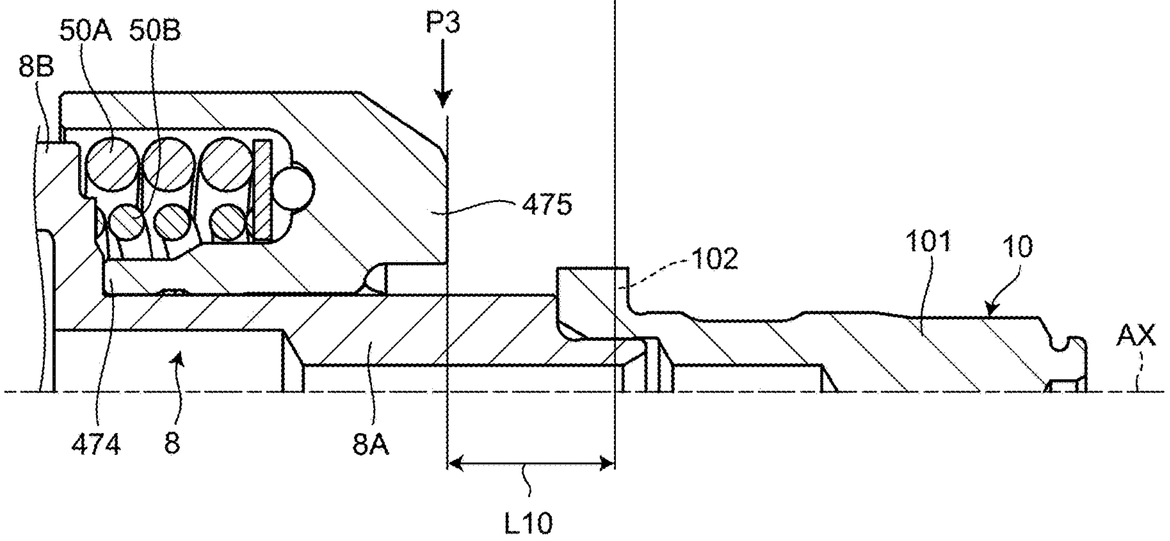

FIGS. 13A-13C are schematic drawings that show the behavior (movement) of the hammer 47 step-by-step during one hammering operation. FIG. 13A shows the state in which the hammer 47 is at position P1, i.e., the advancement limit. FIG. 13B shows the state in which the hammer 47 is at separation position P2. FIG. 13C shows the state in which the hammer 47 is at position P3, i.e., the retraction limit. The position of the hammer 47 is defined by the front-end surface of the hammer 47; that is, it is defined with the position of the front-end surface of the hammer-projection portions 475 as the reference.

As described above, impacts by the hammer 47 start in the situation in which fastening of a fastening member, such as a bolt (not shown), progresses, but the anvil 10 can no longer be rotated by only the driving force of the motor 6. In the state in which the anvil 10 is fixed in position by the fastening member (i.e. rotation of the anvil 10 is temporarily stopped), the hammer 47 retracts (moves axially rearward) from position P1, which is the advancement limit shown in FIG. 13A. As shown in FIG. 13B, when the hammer 47 has retracted beyond separation position P2, at which contact between the hammer-projection portions 475 and the anvil-projection portions 102 is released, the hammer 47 rotates. When the hammer-projection portions 475 pass the anvil-projection portions 102, which had been contacted, in the rotational direction, the hammer 47 can now advance toward the advancement limit (position P1) in the axial direction. That is, the elastic energy of the springs 50, which were compressed by the retraction of the hammer 47, causes the hammer 47 to advance while the spindle 8 rotates the hammer 47. As a result, the hammer-projection portions 475 collide with (impact, hammer) the following anvil-projection portions 102 in the rotational direction.

When the hammer 47 impacts the anvil 10, a reaction force acts on the hammer 47 from the fastening member via the anvil 10. Because the reaction force acts on the hammer 47 in a direction that causes the hammer 47 to rotate in a direction that is the reverse of the hammering direction, the cam mechanism 48 converts the reaction force into a driving force that causes the hammer 47 to retract. Immediately after the impact, the hammer 47 starts to retract so as to rebound axially rearward owing to the reaction force from the fastening member acting on the hammer 47. In this manner, the hammer 47 retracts due to the reaction force from the fastening member, in addition to the driving force of the motor 6, acting on the hammer 47. The amount of retraction of the hammer 47 (the distance that the hammer 47 retracts from position P1, which is the advancement limit) is affected (influenced) by the magnitude of the reaction force from the fastening member. That is, the larger that the reaction force from the fastening member is, the larger that the amount of retraction of the hammer 47 is.

As shown in FIG. 13C, when the hammer 47 retracts to position P3, which is the retraction limit, the hammer 47 stops retracting because it has contacted another member (structure), i.e., not owing to the elastic force of the springs 50. Position P3, which is the retraction limit, is either the position at which the hammer 47 contacts another member or the position at which the springs 50 reach their solid length. In FIG. 13C, because a rear-end portion of the support-ring portion 474 of the hammer 47 contacts the flange portion 8B of the spindle 8, retraction of the hammer 47 stops. In the state in which the springs 50 are compressed to their solid length prior to the hammer 47 contacting another member, the retraction of the hammer 47 stops because the springs can be compressed no further. In either situation, when the hammer 47 reaches its retraction limit, an axial-direction impact occurs accompanying the stopping of the hammer 47, and thereby unnecessary vibrations are generated in the impact tool 1.

The smaller that the reaction force from the fastening member is, the smaller that the amount of retraction of the hammer 47 is. If the amount of retraction of the hammer 47 is relatively small and the hammer 47 has retracted, for example, only to the vicinity of separation position P2, the distance from when the hammer 47 starts to advance until the hammer 47 reaches separation position P2 is also relatively small. Therefore, the hammer-projection portions 475 are unable to pass the anvil-projection portions 102 in the rotational direction up to when the hammer 47 reaches separation position P2, and the front surfaces of the hammer-projection portions 475 collide with the rear surfaces of the anvil-projection portions 102 in the axial direction. After the collision, when the hammer-projection portions 475 rotate beyond the anvil-projection portions 102 in the rotational direction, the hammer 47 resumes advancing and the hammer-projection portions 475 collide with the following anvil-projection portions 102 in the rotational direction. In this situation, if the hammer-projection portions 475 collide with the anvil-projection portions 102 in the axial direction, undesirable vibrations in the impact tool 1 will be generated. In addition, because such a collision between the hammer 47 and the anvil 10 in the axial direction does not contribute to the impact force in the rotational direction and thus results in a loss in the elastic energy of the springs 50, the fastening force will undesirably decrease.

Thus, if the amount of retraction of the hammer 47 due to the reaction force from the fastening member is either too large or too small, it is not preferred from the viewpoint of curtailing the occurrence of the above-described abnormal impacts in the rotational direction and/or in the axial direction. As was explained above, the reaction force from the fastening member depends on the size of the fastening member. More specifically, the reaction force imparted to the hammer 47 is relatively small in case the size of the fastening member is relatively large and thus the amount of energy receivable by the fastening member is relatively large. On the other hand, the reaction force imparted to the hammer 47 is relatively large in case the size of the fastening member is relatively small and thus the amount of energy receivable by the fastening member is relatively small. Thus, by configuring (designing) the springs 50 as will be further explained below, occurrences of abnormal impacts can be curtailed for an even wider range of reaction forces, that is, for fastening members having an even wider range of sizes.

Relationship Between Spring Constant and Set Load

That is, in the present embodiment, the value (ratio Rm) calculated by dividing the combined spring constant (N/mm) at position P1 by combined set load F0 (N) of the springs 50 at position P1 preferably is larger than 0.3. More specifically, combined set load F0 is the overall (total) elastic force of the springs 50 when the hammer 47 is at position P1, which is the advancement limit. When the combined spring constant of the springs 50 is given as K, then it is preferred that the following Equation (1) is satisfied.

$$Rm = K/F0 > 0.3 \tag{1}$$

As described above, the springs 50 include the first spring 50A and the second spring 50B. The first spring 50A and the second spring 50B are provided (arranged) parallel to the hammer 47. In this configuration, overall combined spring constant K of the springs 50 is computed as the total of the spring constants of the first spring 50A and the second spring 50B. When the spring constant of the first spring 50A at position P1 is given as KA and the spring constant of the second spring 50B at position P1 is given as KB, K=KA+KB at position P1. In addition, overall combined set load F0 of the springs 50 is computed as the total of the set loads of the first spring 50A and the second spring 50B at position P1. When the set load of the first spring 50A at position P1 is given as FA0 and the set load of the second spring 50B at position P1 is given as FB0, F0=FA0+FB0 at position P1. In the present embodiment, the value (ratio Rm) calculated by dividing the total of the spring constants of the first spring 50A and the second spring 50B at position P1 by the total of the set loads of the first spring 50A and the second spring 50B at position P1 preferably is larger than 0.3. That is, Equation (2) is preferably satisfied.

$$Rm = (KA + KB)/(FA0 + FB0) > 0.3 \tag{2}$$

More preferably, ratio Rm is larger than 0.45.

In addition, in the present embodiment, the value of ratio Rm also satisfies the condition of being larger than 0.3 for each individual spring at position P1. That is, the value (ratio RmA below) calculated by dividing spring constant KA of the first spring 50A at position P1 by set load FA0 of the first spring 50A at position P1 preferably is larger than 0.3. The value (ratio RmB below) calculated by dividing spring constant KB of the second spring 50B at position P1 by set load FBG of the second spring 50B at position P1 preferably is larger than 0.3. That is, Equation (3) and Equation (4) are also preferably satisfied.

$$RmA = KA/FA0 > 0.3 \tag{3}$$

$$RmB = KB/FB0 > 0.3 \tag{4}$$

The springs 50 preferably have a combined spring constant that is constant in the axial movement range of the hammer 47 from the advancement limit (position P1) of the hammer 47 up to the retraction limit (position P3) of the hammer 47. Furthermore, the first spring 50A and the second spring 50B preferably each have a spring constant that is constant in the axial movement range of the hammer 47 from the advancement limit (position P1) of the hammer 47 up to the retraction limit (position P3) of the hammer 47. The range up to the retraction limit (position P3) excludes the position at which the spring constant of each spring inevitably varies owing to each spring approaching their solid length. In the present embodiment, spring constant KA of the first spring 50A is preferably larger than spring constant KB of the second spring 50B. The wire diameter of the first spring 50A is preferably larger than the wire diameter of the second spring 50B. Spring constant KA of the first spring 50A is preferably two times or more greater than spring constant KB of the second spring 50B. More preferably, spring constant KA of the first spring 50A is 2.3 times or more greater than spring constant KB of the second spring 50B.

The larger that combined spring constant K at position P1 is, the larger that the value of ratio Rm at position P1 is. The smaller that combined set load F0 at position P1 is, the larger that the value of ratio Rm at position P1 is. The spring constant depends on the wire diameter of the wire, the diameter of the spring, etc. Therefore, the range that can be taken for the spring constant is limited by structural restrictions such as housing the springs 50 in the recessed portion 476.

In the embodiment, combined set load F0 at position P1 preferably is larger than 0 Newtons (N). Set loads FA0 and FB0 of the first spring 50A and the second spring 50B, respectively, at position P1 are preferably each larger than 0 N. The set load is determined by the difference between the natural length and the set length of each of the springs 50 at position P1, assuming a given spring constant. The natural length (free length) of each of the springs 50 is the length of the spring 50 in the state in which the spring is not expanded or contracted; i.e. the spring is at rest because no tensile or compressive force is being applied to the spring. The set length is the length of the springs 50 in the state in which the hammer 47 is at position P1, which is the advancement limit. In the present embodiment, the set length of the springs 50 is preferably 90% or more of the free length of the springs 50. Furthermore, the set length of the first spring 50A is preferably 95% or more of the free length of the first spring 50A and the set length of the second spring 50B is preferably 93% or more of the free length of the second spring 50B. In this case, because the set load at position P1 can be made relatively small, the value of ratio Rm can be made relatively large.

In the present embodiment, because the upper limit of ratio Rm is defined in accordance with the structure and specifications of the impact tool 1, it is not particularly limited. Ratio Rm is, for example, smaller than 1.

Relationship Between Spring Constant and Separation Load

In the embodiment, the value (ratio Rd) calculated by dividing the combined spring constant (N/mm) at position P2 by the combined separation load (N) of the springs 50 at position P2 preferably is larger than 0.09. That is, the combined separation load is the elastic force of the (compressed) springs 50 when the hammer 47 is at separation position P2. Preferably, the springs 50 bias the hammer 47 with a prescribed separation load at separation position P2, which is the position at which the hammer 47, which has retracted due to the action of the cam mechanism 48, no longer contacts the anvil 10. In the present embodiment, because the springs 50 include the first spring 50A and the second spring 50B, the value (ratio Rd) calculated by dividing combined spring constant K (N/mm) at position P2 by combined separation load F1 (N) of the springs 50 at position P2 preferably is larger than 0.09. Equation (5) is preferably satisfied with respect to combined spring constant K of the springs 50 at position P2.

$$Rd = K/F1 > 0.09 \tag{5}$$

More preferably, ratio Rd is larger than 0.15.

Overall combined separation load F1 of the springs 50 at position P2 is computed as the total of the separation loads of the first spring 50A and the second spring 50B at position P2. When the separation load of the first spring 50A at position P2 is given as FA1 and the separation load of the second spring 50B at position P2 is given as FB1, F1=FA1+FB1 at position P2. In the present embodiment, the value (ratio Rd) calculated by dividing the total of the spring constants of the first spring 50A and the second spring 50B at position P2 by the total of the separation loads of the first spring 50A and the second spring 50B at position P2 preferably is larger than 0.09. That is, Equation (6) is preferably satisfied.

$$Rd = (KA + KB)/(FA1 + FB1) > 0.09 \tag{6}$$

In addition, in the present embodiment, the value of ratio Rd is also preferably larger than 0.09 for each individual spring. That is, the value (ratio RdA below) calculated by dividing spring constant KA of the first spring 50A at position P2 by separation load FA1 of the first spring 50A at position P2 preferably is larger than 0.10. The value (ratio RdB) calculated by dividing spring constant KB of the second spring 50B at position P2 by separation load FB1 of the second spring 50B at position P2 preferably is larger than 0.09. Accordingly, Equation (7) and Equation (8) are preferably satisfied.

$$RdA = KA/FA1 > 0.10 \tag{7}$$

$$RdB = KB/FB1 > 0.09 \tag{8}$$

The smaller that combined separation load F1 at position P2 is, the larger that the value of ratio Rd at position P2 is. The separation load is determined by the amount of deflection (compression) of the springs 50 at separation position P2, assuming a given spring constant. That is, the smaller the distance L11 from position P1, which is the advancement limit of the hammer 47, to separation position P2 (i.e., the smaller the amount of deflection from the set length), the smaller the separation load.

In the present embodiment, the separation length, which is the length of the springs 50 in the state in which the hammer 47 is at separation position P2, is preferably 75% or more of the free length of the springs 50. The separation length of the first spring 50A is preferably 79% or more of the free length of the first spring 50A. The separation length of the second spring 50B is preferably 80% or more of the free length of the second spring 50B. Thereby, because combined separation load F1 can be made relatively small, the value of ratio Rd becomes relatively large. It is noted that, naturally, combined separation load F1 and separation loads FA1, FB1 are larger than 0 N.

In the present embodiment, because the upper limit of ratio Rd is defined in accordance with the structure and specification of the impact tool 1, it is not particularly limited. Ratio Rd is, for example, smaller than 0.5.

In addition, in the present embodiment, distance L11 from the advancement limit of the hammer 47 (position P1) to separation position P2 is preferably 50% or less of distance L10 from the advancement limit (position P1) to the retraction limit (position P3) of the hammer 47. Thereby, the margin from where the hammer 47, which is rebounding owing to the reaction force from the fastening member, reaches separation position P2 to where the hammer 47 arrives at the retraction limit (position P3) becomes relatively large. Therefore, when the hammer 47 retracts, it is less likely that the hammer 47 will reach the retraction limit.

It is noted that the maximum fastening torque of the impact tool 1 is not particularly limited. In the present embodiment, the maximum fastening torque of the impact tool 1 is preferably 1,300 N·m or more and 3,000 N·m or less. There is a great need to expand the size range, i.e., both the upper-limit size and the lower-limit size, of fastening members that are fastenable by the impact tool 1, which has a maximum fastening torque of 1,300 N·m or more and 3,000 N·m or less. Therefore, by designing the impact tool 1 of the embodiment to employ a torque band in which the maximum fastening torque is 1,300 N·m or more and 3,000 N·m or less, the size range of fastening members that are fastenable without generating abnormal impacts can be expanded effectively. It is noted that the maximum fastening torque is the torque when fastening a fastening member and generally refers to the torque measured by a supplemental fastening torque method with respect to the fastening member after fastening. The supplemental fastening torque method is a method that measures, in addition to the torque of the fastening member after fastening, the torque when the fastening member resumes turning. It is noted that this is not a method in which a nut or a bolt is loosened and the torque measured. This maximum fastening torque is generally stated in each manufacturer's catalog.

Impact Tool

Next, the operation of the impact tool 1 will be explained. For example, when performing bolt-fastening work on a work object, the user grips the grip part 22 with, for example, their right hand and pulls the trigger lever 14 with the index finger of their right hand. When the trigger lever 14 is pulled, electric power is supplied from the battery pack 25 to the motor 6, the motor 6 starts, and the light 17 turns ON at the same time. Owing to the starting of the motor 6, the rotor shaft 33 rotates. When the rotor shaft 33 rotates, the rotational force of the rotor shaft 33 is transmitted to the planet gears 42 via the pinion gear 41. Because the planet gears 42 are meshed with the inner teeth of the internal gear 43, the planet gears 42 revolve around the pinion gear 41 while rotating. The planet gears 42 are supported in a rotatable manner by the spindle 8 via the respective pins 42P. Owing to the revolving of the planet gears 42, the spindle 8 rotates at a rotational speed that is lower than the rotational speed of the rotor shaft 33.

In the state in which the hammer-projection portions 475 and the anvil-projection portions 102 are in (continuous) contact with each other and the spindle 8 rotates, the anvil 10 rotates together with the hammer 47 and the spindle 8. As the anvil 10 rotates, the bolt-fastening work progresses.

When a load (torque) equal to or greater than a prescribed (predetermined) value acts on the anvil 10 during the bolt-fastening operation, rotation of the anvil 10 and the hammer 47 temporarily stops. Because the spindle 8 continues to be rotated in the state in which the rotation of the hammer 47 is temporarily stopped, the cam mechanism 48 causes the hammer 47 to move axially rearward. When the hammer 47 has moved axially rearward beyond position P2 (the hammer separation position), contact between the hammer-projection portions 475 and the anvil-projection portions 102 is released.

When the hammer 47 moves sufficiently rearward that it no longer contacts the anvil 10, the hammer 47 rotates relative to the spindle-shaft portion 8A. The washer 61 is separated from the hammer 47 and the spindle 8. Therefore, the rotation of the hammer 47 is not obstructed by the washer 61. In addition, the support balls 54 are disposed between the washer 61 and the hammer 47. The hammer 47 can rotate smoothly owing to the rotation of the support balls 54.

In addition, when the hammer 47 moves sufficiently rearward that it no longer contacts the anvil 10, the elastic force of the first spring 50A and the second spring 50B, which have been compressed by the rearward movement of the hammer 47, causes the hammer 47 to move axially forward while the spindle 8 rotates the hammer 47. When the hammer 47 moves forward while rotating, the anvil-projection portions 102 are impacted (struck, hammered) in the rotational direction by the hammer-projection portions 475. Thereby, the anvil 10 can be rotated around rotational axis AX with higher torque owing to the hammering operation. Consequently, the bolt can be fastened to the work object with higher torque.

Functions and Effects

The effects of the impact tool 1 according to the present embodiment will be described below while making comparisons to impact tools that comprise springs according to conventional examples.

Table 1 shows design values (parameters) concerning the springs in a working example, which is one concrete example of the impact tool 1 according to the embodiment, and in Comparative Example 1 and Comparative Example 2, which are impact tools comprising springs according to conventional examples. In Table 1, the "normal length" refers to the maximum retractable distance of the hammer that the cam mechanism permits. The normal length in Table 1 is different from the normal length of a spring, which is used as a common technical term. The "normal load" is the (combined) elastic force of the spring(s) when the hammer is at the position that is the "normal length".

TABLE 1

| | | Working Example | | | | |
|---|---|---|---|---|---|---|
| | | First Spring | Second Spring | TOTAL | Comparative Example 1 | Comparative Example 2 |
| Wire Diameter | [mm] | 6.0 | 4.0 | | 6.5 | 5.5 |
| Inner Diameter | [mm] | 45.5 | 34.4 | | 40.0 | 42.0 |
| Total Winding Count | [T] | 3.75 | 4.00 | | 3.25 | 4.00 |
| Free Length | [mm] | 40.7 | 39.7 | | 47.1 | 50.0 |
| Set Length | [mm] | 38.8 | 37.0 | | 38.8 | 38.8 |
| Set Load | [N] | 101.1 | 59.9 | 161.0 | 826.3 | 375.3 |
| Separation Length | [mm] | 30.8 | 29.0 | | 30.8 | 30.8 |
| Separation Load | [N] | 526.7 | 237.3 | 764.0 | 1622.6 | 643.4 |
| Normal Length | [mm] | 21.0 | 19.2 | | 25.0 | 25.0 |
| Normal Load | [N] | 1048.1 | 454.7 | 1502.8 | 2200.0 | 837.8 |
| Spring Constant | [N/mm] | 53.2 | 22.2 | 75.4 | 99.5 | 33.5 |
| Ratio Rm | | 0.53 | 0.37 | 0.47 | 0.12 | 0.09 |
| Ratio Rd | | 0.101 | 0.093 | 0.099 | 0.061 | 0.052 |

With regard to the first spring 50A of the working example, spring constant KA was 53.2 N/mm, set load FA0 was 101.1 N, and separation load FA1 was 526.7 N. With regard to the second spring SOB of the working example, spring constant KB was 22.2 N/mm, set load FB0 was 59.9 N, and separation load FB1 was 237.3 N. The total of the spring constants of the first spring 50A and the second spring SOB (i.e., combined spring constant K) was 75.4 N/mm, the total of the set loads of the first spring 50A and the second spring SOB (i.e., combined set load F0) was 161.0 N, and the total of the separation loads of the first spring 50A and the second spring SOB (i.e., combined separation load F1) was 764.0 N.

Thereby, in the impact tool according to the working example, the overall ratio Rm of the springs 50 was ratio Rm=0.47 according to Equation (2). In addition, ratio RmA of the first spring 50A was ratio RmA=0.53 according to Equation (3). Furthermore, ratio RmB of the second spring SOB was ratio RmB=0.37 according to Equation (4). In the working example, ratio Rm, ratio RmA, and ratio RmB were all larger than 0.3.

In addition, overall ratio Rd of the springs 50 was ratio Rd=0.099 according to Equation (6). In addition, ratio RdA of the first spring 50A was ratio RdA=0.101 according to Equation (7). Furthermore, ratio RdB of the second spring 50B was ratio RdB=0.093 according to Equation (8). In the working example, ratio Rd, ratio RdA, and ratio RdB were all larger than 0.09. In addition, ratio RdA was larger than 0.10. The maximum fastening torque of the impact tool 1 according to the working example was 1,700 N·m.

In the working example, the inner diameter of the first spring 50A (45.5 mm) was larger than the inner diameter of the second spring 50B (34.4 mm). Spring constant KA of the first spring 50A was approximately 2.40 times the spring constant KB of the second spring 50B. The set length of the first spring 50A (38.8 mm) was approximately 95% of the free length of the first spring 50A (40.7 mm). The set length of the second spring 50B (37.0 mm) was approximately 93% of the free length of the second spring 50B (39.7 mm). The separation length of the first spring 50A (30.8 mm) was approximately 76% of the free length of the first spring 50A (40.7 mm). The separation length of the second spring 50B (29 mm) was approximately 73% of the free length of the second spring 50B (39.7 mm). Distance L11 from the advancement limit to separation position P2 of the hammer 47 was approximately 55% of distance L10 from the advancement limit to the retraction limit of the hammer 47.

It is noted that, in the working example, the speed-reduction ratio of the speed-reducing-mechanism part 7 was 1/15.67.

Comparative Example 1 and Comparative Example 2 are each an impact tool that has a single spring (50).

With regard to the spring in Comparative Example 1, the spring constant was 99.5 N/mm, the set load was 826.3 N, and the separation load was 1,622.6 N. In Comparative Example 1, ratio Rm of the spring was ratio Rm=0.12 according to Equation (1). In Comparative Example 1, ratio Rd of the spring was ratio Rd=0.061 according to Equation (5). The maximum fastening torque in Comparative Example 1 was 1,700 N·m.

With regard to the spring in Comparative Example 2, the spring constant was 33.5 N/mm, the set load was 375.3 N, and the separation load was 643.4 N. In Comparative Example 2, ratio Rm of the spring was ratio Rm=0.09 according to Equation (1). In Comparative Example 2, ratio Rd of the spring was ratio Rd=0.052 according to Equation (5). The maximum fastening torque in Comparative Example 2 was 1,700 N·m.

Thus, ratio Rm was smaller than 0.3 in both Comparative Example 1 and Comparative Example 2. Ratio Rd was smaller than 0.09 in both Comparative Example 1 and Comparative Example 2. In Comparative Example 1, although the spring constant was large, because the set load and the separation load were also large, ratio Rm and ratio Rd were small compared with the working example. In Comparative Example 2, although the set load and the separation load were comparatively small, because the spring constant was also small, ratio Rm and ratio Rd were small compared with the working example.

It is noted that the speed-reduction ratio of the speed-reducing-mechanism part in Comparative Example 1 and Comparative Example 2 was 1/15.67, which was the same as in the working example.

Hammer-Operation Test

A hammer-operation test was performed using the impact tool 1 according to the working example, the impact tool according to Comparative Example 1, and the impact tool according to Comparative Example 2.

In the hammer-operation test, to investigate whether or not an abnormal impact occurred, the hammering operation was performed under a plurality of conditions in which the spring specifications were different when fastening the fastening member.

In the working example (i.e., an embodiment in which the combined spring constant was 75.4 N/mm, the combined set load was 161.0 N, the combined separation load was 764.0 N, Rm=0.47, and Rd=0.099), no abnormal impacts in which the hammer 47 collides with the anvil 10 in the axial direction and no abnormal impacts in which the hammer 47 collides with another structure at the retraction limit occurred while fastening high-strength, friction-joining bolts (high strength friction grip bolts) having nominal diameters in the range of M20-M30.

In Comparative Example 1 (i.e., an embodiment in which the spring constant was 99.5 N/mm, the set load was 826.3 N, the separation load was 1,622.6 N, Rm=0.12, and Rd=0.061), a test was performed by fastening high-strength, friction-joining bolts (high strength friction grip bolts) having nominal diameters in the range of M20-M30, and abnormal impacts in which the hammer collided with another structure at the retraction limit did not occur. However, although abnormal impacts in which the hammer collided with the anvil in the axial direction did not occur when the nominal diameter was less than M30, abnormal impacts in which the hammer collided with the anvil in the axial direction did occur when the nominal diameter was M30.

In Comparative Example 2 (i.e., an embodiment in which the spring constant was 33.5 N/mm, the set load was 375.3 N, the separation load was 643.4 N, Rm=0.09, and Rd=0.052), a test was performed by fastening high-strength, friction-joining bolts (high strength friction grip bolts) having nominal diameters in the range of M20-M30, and abnormal impacts in which the hammer collided with the anvil in the axial direction did not occur. However, although abnormal impacts in which the hammer collided with another structure at the retraction limit did not occur when the nominal diameter was greater than M20, abnormal impacts in which the hammer collided with another structure at the retraction limit did occur when the nominal diameter was M20.

Based on these results, it was determined that abnormal impacts in which the hammer collided with another structure at the retraction limit did not occur in embodiments in which the spring constant was larger, and abnormal impacts in which the hammer collided with the anvil in the axial direction did not occur in embodiments in which the set load and the separation load were smaller. However, abnormal impacts in which a collision in the axial direction did occur when fastening bolts having nominal diameter M30 in embodiments in which the set load and the separation load were larger, and abnormal impacts in which a collision at the retraction limit did occur when fastening bolts having nominal diameter M20 in embodiments in which the spring constant was smaller. In other words, it was determined that neither of these two types of abnormal impacts occurs with high-strength, friction-joining bolts (high strength friction grip bolts) having nominal diameters in the range of M20-M30 when Rm and Rd, which are expressed by ratios between the (combined) set load, the (combined) separation load, and the (combined) spring constant, were in the ranges of Rm>0.30 and Rd>0.090. Based on this result, it was confirmed that the impact tool 1 according to the above-described embodiment (working example) can curtail occurrences of abnormal impacts in an even broader range of reaction forces.

As explained above, in the above-described embodiment, the impact tool 1 comprises: the motor 6; the hammer 47, which is rotated by the motor 6; the anvil 10, which is impacted by the hammer 47 in the rotational direction; two or more of the springs 50 (the first spring 50A and the second spring 50B), which bias the hammer 47 forward toward the anvil 10 in the axial direction and are disposed parallel (concentric) to the hammer 47; the cam mechanism 48, which alternately retracts the hammer 47 while compressing the springs 50 in response to application of the driving force of the motor 6 and permits the hammer 47 to be advanced by the elastic force of the compressed springs 50; and the hammer-housing part 4, which houses the hammer 47. The springs 50 bias the hammer 47 with a combined set load in the state in which the hammer 47 is at position P1, which is the advancement limit of the hammer 47. The value (ratio Rm) calculated by dividing combined spring constant K (N/mm) at position P1 by combined set load F0 (N) of the springs 50 at position P1 is larger than 0.3.

In the above-mentioned configuration, the smaller that combined set load F0 at position P1 and the larger that combined spring constant K of the springs 50 at position P1 are, the larger that the value (ratio Rm) calculated by dividing the combined spring constant K at position P1 by combined set load F0 at position P1 is. Because combined set load F0 is relatively small, the amount of retraction of the hammer 47 becomes large even in the situation in which the reaction force from the fastening member (a bolt, a screw, or the like) is relatively small at the time of impact. Therefore, occurrences of collisions of the hammer 47 with the anvil 10 in the axial direction owing to an insufficient amount of retraction can be curtailed, even in the situation in which the reaction force is small. On the other hand, because the combined spring constant K is relatively large, the elastic force of the springs 50 greatly increases as the hammer 47 retracts and the springs 50 are compressed, effectively canceling out the reaction force from the fastening member. Therefore, occurrences of collisions of the hammer 47 with a rearward member and occurrences of the springs 50 reaching their solid length without the hammer 47 retracting excessively are curtailed, even in the situation in which the reaction force is large. As described above, by making ratio Rm to be larger than 0.3, occurrences of abnormal impacts can be curtailed, even in the situation in which a large reaction force or a small reaction force is applied. Thereby, occurrences of abnormal impacts can be curtailed even if the impact tool 1 is employed to fasten fastening members having a wide range of sizes.

In the above-described embodiment, the springs 50 include the first spring 50A and the second spring 50B, which are provided parallel (concentric) to the hammer 47. The value (ratio RmA) calculated by dividing spring constant KA of the first spring 50A at position P1 by set load FA0 of the first spring 50A at position P1 is larger than 0.3. The value (ratio RmB) calculated by dividing spring constant KB of the second spring 50B at position P1 by set load FB0 of the second spring 50B at position P1 is larger than 0.3.

In the above-mentioned configuration, by employing a structure in which the hammer 47 is biased by the plurality of springs 50 (i.e., the first spring 50A and the second spring 50B), and by making the ratios RmA, RmB of the springs to be larger than 0.3, occurrences of abnormal impacts can be curtailed while relaxing the design constraints on the springs 50.

In the above-described embodiment, the springs 50 include the first spring 50A and the second spring 50B. Inner diameter D1 of the first spring 50A is greater than inner diameter D2 of the second spring 50B. Spring constant KA of the first spring 50A is two times or more the spring constant KB of the second spring 50B.

In the above-mentioned configuration, the spring constant of the second spring 50B can be made relatively small.

Therefore, it is possible to utilize a second spring 50B, in which the wire of the second spring 50B, which has a small inner diameter, can have a relatively small wire diameter and thus the winding count of the second spring 50B can be relatively large. As a result, the solid length of the second spring B050 need not be excessively long and a relative shortening of the lifespan of the second spring can be avoided.

In the above-described embodiment, set length L0, which is the length of the springs 50 in the state in which the hammer 47 is at position P1, which is the advancement limit of the hammer 47, is 90% or more of the free length of the springs 50.

In the above-mentioned configuration, the set load of the springs 50 can effectively be made relatively small by making set length L0 of the springs 50 relatively large, that is, by making the amount of deflection (compression, preload) at time of setting at position P1 relatively small. As a result, the hammer 47 can be caused to retract to the distance required to avoid a collision between the hammer 47 and the anvil 10 in the axial direction, even if the reaction force from the fastening member is relatively small.

In the above-described embodiment, the hammer 47, when retracted by the cam mechanism 48, no longer contacts the anvil 10 upon reaching separation position P2. Distance L11 from the advancement limit to separation position P2 of the hammer 47 is 50% or less of distance L10 from the advancement limit to the retraction limit of the hammer 47.

In the above-mentioned configuration, because distance L11 to separation position P2 is relatively small, the hammer 47 can easily axially move past separation position P2, even if the reaction force from the fastening member is relatively small and the amount of retraction is relatively small, and therefore occurrences of collisions between the hammer 47 and the anvil 10 in the axial direction can be curtailed. Furthermore, because the distance from separation position P2 to the retraction limit is relatively large, occurrences of the hammer 47 reaching the retraction limit and colliding with another member (thereby generating undesirable vibrations) can be curtailed, even if the reaction force from the fastening member is relatively large.

In the above-described embodiment, the springs 50 have a spring constant that is constant in the axial movement range of the hammer 47 from the advancement limit (position P1) of the hammer 47 to a prescribed position, which is up to the retraction limit (position P3) of the hammer 47.

In the above-mentioned configuration, occurrences of abnormal impacts can be curtailed without having to employ special (expensive) nonlinear springs for the springs 50. In addition, because the spring constants do not vary in accordance with the position of the hammer 47 within the axial movement range of the hammer 47 during normal hammering operations, the hammer 47 can operate smoothly when the hammer 47 advances or retracts.

In the embodiment, the maximum fastening torque of the impact tool 1 is 1,300 N·m or more and 3,000 N·m or less.

In the above-mentioned configuration of an impact tool 1 that is capable of generating a relatively large impact force by the hammer 47, the occurrences of abnormal impacts can be curtailed and a deterioration in the user's impression of the impact tool 1 caused by abnormal impacts can be avoided, even if the impact tool 1 is used to perform fastening of both a large-sized fastening member and a small-sized fastening member.

In the embodiment, combined set load F0 of the springs 50 at position P1 is greater than 0 N, i.e. the springs 50 are preloaded at position P1, i.e. the advancement limit position of the hammer 47.

In the above-mentioned configuration, no play is created at the mounting location of the springs 50 due to dimensional tolerances. Thereby, movement (rattling) of the springs 50 can be prevented when the impact tool 1 is not in use.

In the above-described embodiment, the impact tool 1 comprises: the motor 6; the hammer 47, which is rotated by the motor 6; the anvil 10, which is impacted by the hammer 47 in the rotational direction; at least one spring 50, which biases the hammer 47 forward toward the anvil 10 in the axial direction; the cam mechanism 48, which alternately retracts the hammer 47 while compressing the springs 50 in the axial direction and permits the hammer 47 to be advanced by the elastic force of the compressed spring 50 in the axial direction; and the hammer-housing part 4, which houses the hammer 47. The at least one spring 50 biases the hammer 47 with a separation load at separation position P2 at which the hammer 47, which has been retracted by the cam mechanism 48, no longer contacts the anvil 10. The value (ratio Rd) calculated by dividing combined spring constant K (N/mm) at separation position P2 by combined separation load F1 (N) of the at least one spring 50 at separation position P2 is larger than 0.09.

In the above-mentioned configuration, the smaller that the separation load F1 at separation position P2 and the larger that the spring constant K of the at least one spring 50 at separation position P2 are, the larger that the value (ratio Rd) calculated by dividing the spring constant K at separation position P2 by separation load F1 at separation position P2 is. Because separation load F1 at separation position P2 is relatively small, the amount of retraction of the hammer 47 becomes large even if the reaction force from the fastening member (a bolt, a screw, or the like) is relatively small at the time of impact. Therefore, occurrences of collisions of the hammer 47 with the anvil 10 in the axial direction owing to an insufficient amount of retraction can be curtailed, even if the reaction force is small. On the other hand, because the spring constant K at separation position P2 is relatively large, the elastic force of the at least one spring 50 greatly increases as the hammer 47 retracts and the at least one spring 50 is compressed, effectively canceling out the reaction force from the fastening member. Therefore, occurrences of collisions of the hammer 47 with a rearward member and occurrences of the at least one spring 50 reaching its solid length without the hammer 47 retracting excessively are curtailed, even if the reaction force is large. As described above, by making ratio Rd to be larger than 0.09, occurrences of abnormal impacts can be curtailed, even in situations in which a large reaction force or a small reaction force is applied. Thereby, occurrences of abnormal impacts can be curtailed even if the impact tool 1 is employed to fasten fastening members having a wide range of sizes.

In the above-described embodiment, the spring 50 include the first spring 50A and the second spring 50B, which are provided parallel (concentrically) to the hammer 47. The value (ratio Rd) calculated by dividing the total of the spring constants (combined spring constant) of the first spring 50A and the second spring 50B at separation position P2 by the total of the separation loads of the first spring 50A and the second spring 50B at separation position P2 is larger than 0.09.

In the above-mentioned configuration, by providing the first spring 50A and the second spring 50B parallel to each other, overall ratio Rd can easily be made larger than 0.09 for the springs 50. In addition, the wire diameters of the first spring 50A and the second spring 50B, individually, may be small compared with an embodiment having only a single spring; thus, the solid lengths of the springs 50 can be shortened, and therefore design constraints on the springs 50 can be relaxed.

As was noted above, the springs 50 include the first spring 50A and the second spring 50B, which are provided parallel to the hammer 47. The value (ratio RdA) calculated by dividing spring constant KA of the first spring 50A at separation position P2 by separation load FA1 of the first spring 50A at separation position P2 is larger than 0.10. The value (ratio RdB) calculated by dividing spring constant KB of the second spring 50B at separation position P2 by separation load FB1 of the second spring 50B at separation position P2 is larger than 0.09.

In the above-mentioned configuration, by employing a structure in which the hammer 47 is biased by the plurality of springs 50 (i.e., the first spring 50A and the second spring 50B), and by making the spring ratios RdA, RdB to be larger than 0.10 and 0.09, respectively, occurrences of abnormal impacts can be curtailed while relaxing the design constraints on the springs 50.

In the embodiment, separation length L1, which is the length of the spring(s) 50 in the state in which the hammer 47 is at separation position P2, is 75% or more of the free length of the spring(s) 50.

In the above-mentioned configuration, the separation load of the spring(s) 50 at separation position P2 can effectively be made relatively small by making separation length L1 of the springs 50 at separation position P2 relatively large, that is, by making the amount of deflection (compression) at separation position P2 relatively small. As a result, the amount of retraction required to avoid a collision between the hammer 47 and the anvil 10 in the axial direction can be easily achieved, even if the reaction force from the fastening member is small.

In the embodiment, the impact tool 1 comprises the speed-reducing-mechanism part 7, which is configured to transmit rotational force generated by the motor 6 to the hammer 47 at a lower rotational speed than the rotational speed of the rotor 27 of the motor 6. The speed-reduction ratio of the speed-reducing-mechanism part 7 is 1/15 or more and 1/100 or less.

In the above-mentioned configuration, a large fastening torque can be generated by the speed-reducing-mechanism part 7.

In the embodiment, the impact tool 1 comprises: the motor 6; the hammer 47, which is rotated by the motor 6; the anvil 10, which is impacted by the hammer 47 in the rotational direction; the at least one spring 50 (preferably two springs 50A, 50B), which bias(es) the hammer 47 forward toward the anvil 10 in the axial direction; the cam mechanism 48, which alternately retracts the hammer 47 while compressing the springs 50 in the axial direction and permits the hammer 47 to be advanced by the elastic force of the compressed spring(s) 50; and the hammer-housing part 4, which houses the hammer 47. The spring(s) 50 bias(es) the hammer 47 with a (combined) set load in the state in which the hammer 47 is at position P1, which is the advancement limit of the hammer 47. The value (ratio Rm) calculated by dividing the (combined) spring constant (N/mm) at position P1 by the set load (N) of the spring(s) 50 at position P1 is larger than 0.3. The maximum fastening torque of the impact tool 1 is 1,300 (N·m) or more.

In the above-mentioned configuration, the smaller that the set load and the larger that the spring constant of the spring(s) 50 are, the larger that the value (ratio Rm) calculated by dividing the spring constant by the set load is. Because the set load is relatively small, the amount of retraction of the hammer 47 becomes large even if the reaction force from the fastening member (a bolt, a screw, or the like) is small at the time of impact. Therefore, occurrences of collisions of the hammer 47 with the anvil 10 in the axial direction owing to an insufficient amount of retraction can be curtailed, even if the reaction force is small. On the other hand, because the spring constant is relatively large, the elastic force of the spring(s) 50 greatly increases as the hammer 47 retracts and the spring(s) 50 is (are) compressed, effectively canceling out the reaction force from the fastening member. Therefore, occurrences of collisions of the hammer 47 with a rearward member and occurrences of the spring(s) 50 reaching its (their) solid length without the hammer 47 retracting excessively are curtailed, even if the reaction force is large. By making ratio Rm to be larger than 0.3, occurrences of abnormal impacts can be curtailed, even in situations in which either a large reaction force or a small reaction force is applied. Thereby, occurrences of abnormal impacts can be curtailed even if the impact tool is employed to fasten fastening members having a wide range of sizes.

OTHER EMBODIMENTS

In the embodiment described above, the impact tool 1 is assumed to be an impact wrench. However, the impact tool 1 may instead be an impact driver. In such an embodiment, the impact tool (driver) 1 comprises an anvil 10 having a mounting hole formed therein for mounting (receiving) a driver bit that serves as the tool accessory.

In the embodiment described above, it is assumed that the spring(s) 50 include(s) the first spring 50A and the second spring 50B. However, in alternate embodiments according to the present teachings, the spring(s) 50 may be a single spring or may include three or more springs.

In the embodiment described above, it is assumed that the springs 50 have spring constants that are constant within the axial movement range of the hammer 47 during normal hammering operations. However, the springs 50 may instead be nonlinear springs having varying spring constants within the axial movement range of the hammer 47 during normal hammering operations. In embodiments in which the springs 50 are nonlinear springs having spring constants that vary in accordance with the position of the hammer, the spring constant employed in calculating ratio Rm, ratio RmA, ratio RmB, ratio Rd, ratio RdA, and ratio RdB is the spring constant when the hammer 47 is at separation position P2. The spring constant when the hammer 47 is at position P1, which is the advancement limit, may be smaller than the spring constant when the hammer 47 is at separation position P2. The spring constant when the hammer 47 is at position P3, which is the retraction limit, may be larger than the spring constant when the hammer 47 is at separation position P2.

In the embodiments described above, the electric-power supply of the impact tool 1 is not required to be the battery pack 25 and may be a commercial power supply (AC power supply).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact tools and similar power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Impact tool
2 Housing
2R Right housing
2L Left housing
3 Cover
4 Hammer-housing part
6 Motor
7 Speed-reducing-mechanism part
8 Spindle
8A Spindle-shaft portion
8B Flange portion
8C Protruding portion
8D Spindle groove
9 Impact-mechanism part
10 Anvil
12 Fan
13 Battery-mounting part
14 Trigger lever
15 Forward/reverse-change lever
16B Indicator display device
16A Manipulatable button
16 Operation-and-display part
17 Light
19 Air-intake port
20 Air-exhaust port
21 Motor-housing part
21B Rear-surface portion
21A Circumferential-surface portion
22 Grip part
23 Battery-holding part
24 Bearing box
25 Battery pack
26 Stator
27 Rotor
28 Stator core
29 Front insulator
29A Outer-circumferential portion
29B Engagement-surface portion
30 Rear insulator
30A Outer-circumferential portion
30B Engaging-recessed portion
30C Engaging surface
31 Coil
32 Rotor core
33 Rotor shaft
34 Rotor magnet
37 Sensor board
38 Busbar unit
39 Rotor bearing
39R Rear-side rotor bearing
39F Front-side rotor bearing
41 Pinion gear
42P Pin
42 Planet gear
43 Internal gear
44 Spindle bearing
46 Anvil bearing
46A Recessed portion
47 Hammer
48 Cam mechanism
49 Hammer ball
50 Spring
50A First spring
50B Second spring
53 Washer
54 Support ball
61 Washer
71 Support-wall part
73 Column part
73A First support surface
73B Second support surface
74 Support rib
74A First support surface
74B Second support surface
101 Anvil-shaft portion
102 Anvil-projection portion
103 Recessed portion
104 Groove portion
241 Recessed portion
242 Recessed portion
401 First tube portion
402 Second tube portion
402R Rear surface
403 Connecting portion
471 Base portion
473 Rear-side ring portion
474 Support-ring portion
475 Hammer-projection portion
476 Recessed portion
477 Hammer groove
478 Support groove
AX Rotational axis
D1 Inner diameter
D2 Inner diameter
F0 Combined set load
F1 Combined separation load
L0 Set length
L1 Separation length L10 Distance
L11 Distance
P1 Position that is the advancement limit
P2 Separation position
P3 Position that is the retraction limit
W Width

The invention claimed is:

1. An impact tool comprising:
a motor;
a hammer, which is rotated by the motor;
an anvil, which is impacted by the hammer in a rotational direction;
two or more springs, which bias the hammer forward in an axial direction toward the anvil and are disposed parallel to each other;
a cam mechanism configured to alternately (i) retract the hammer while compressing the springs in the axial direction in response to application of the driving force of the motor and (ii) permit the hammer to be advanced in the axial direction by the elastic force of the compressed springs; and
a hammer-housing part, which houses the hammer;
wherein:
in the state in which the hammer is at an advancement limit position of the hammer in the axial direction, the springs bias the hammer forward in the axial direction with a combined set load; and
the value calculated by dividing the combined spring constant (N/mm) of the springs at the advancement limit position by the combined set load (N) of the springs at the advancement limit position is larger than 0.3.

2. The impact tool according to claim 1, wherein:
the springs include a first spring having a first spring constant and a second spring having a second spring constant;
the inner diameter of the first spring is larger than the inner diameter of the second spring; and
the first spring constant is two times or more the second spring constant.

3. The impact tool according to claim 1, wherein a set length, which is the length of the springs in the state in which the hammer is at the advancement limit position, is 90% or more of the free length of each of the springs.

4. The impact tool according to claim 1, wherein:
the hammer is axially movable to a hammer separation position, at which the hammer becomes spaced apart from the anvil in the axial direction, and to a retraction limit position, at which the hammer is not further movable in the axial direction in the direction opposite of the advancement limit position; and
the axial distance from the advancement limit position to the hammer separation position of the hammer is 50% or less of the axial distance from the advancement limit position to the retraction limit position of the hammer.

5. The impact tool according to claim 1, wherein the springs respectively have spring constants that are constant in a range of hammer axial movement from the advancement limit position of the hammer to up to a retraction limit position of the hammer.

6. The impact tool according to claim 1, wherein the impact tool has a maximum fastening torque of 1,300 N·m or more and 3,000 N·m or less.

7. The impact tool according to claim 1, wherein the combined set load of the springs at the advancement limit position is larger than 0 Newtons.

8. An impact tool comprising:
a motor;
a hammer, which is rotated by the motor;
an anvil, which is impacted by the hammer in a rotational direction;
a first spring, which biases the hammer forward in an axial direction toward the anvil;
a cam mechanism configured to alternately (i) retract the hammer while compressing the first spring in the axial direction in response to application of the driving force of the motor and (ii) permit the hammer to be advanced in the axial direction by the elastic force of the compressed first spring; and
a hammer-housing part, which houses the hammer;
wherein:
at a hammer separation position at which the hammer becomes spaced apart from the anvil in the axial direction, the first spring biases the hammer forward in the axial direction with a separation load; and
the value calculated by dividing the spring constant (N/mm) of the first spring at the hammer separation position by the separation load (N) of the first spring at the hammer separation position is larger than 0.09.

9. The impact tool according to claim 8, wherein:
a second spring is provided parallel to the hammer; and
the value calculated by dividing the total of the spring constants of the first spring and the second spring at the hammer separation position by the total of the separation loads of the first spring and the second spring at the hammer separation position is larger than 0.09.

10. The impact tool according to claim 8, wherein:
a second spring is provided parallel to the hammer;
the value calculated by dividing the spring constant of the first spring at the hammer separation position by the separation load of the first spring at the hammer separation position is larger than 0.10; and
the value calculated by dividing the spring constant of the second spring at the hammer separation position by the separation load of the second spring at the hammer separation position is larger than 0.09.

11. The impact tool according to claim 9, wherein:
the inner diameter of the first spring is larger than the inner diameter of the second spring; and
the spring constant of the first spring at the hammer separation position is two times or more the spring constant of the second spring at the hammer separation position.

12. The impact tool according to claim 8, wherein a separation length, which is the length of the first spring at the hammer separation position, is 75% or more of the free length of the first spring.

13. The impact tool according to claim 8, wherein the axial distance from an advancement limit position of the hammer in the axial direction to the hammer separation position is 50% or less of the axial distance from the advancement limit position to a retraction limit position of the hammer, at which the hammer is not further movable in the axial direction in the direction opposite of the advancement limit position.

14. The impact tool according to claim 13, wherein the first spring has a spring constant that is constant in a range from the advancement limit position of the hammer up to the retraction limit position of the hammer.

15. The impact tool according to claim 8, wherein the impact tool has a maximum fastening torque of 1,300 N·m or more and 3,000 N·m or less.

16. The impact tool according to claim 13, wherein the set load of the first spring is larger than 0 Newtons in the state in which the hammer is at the advancement limit position of the hammer.

17. The impact tool according to claim 8, further comprising:

a speed-reducing mechanism configured to transmit rotational force generated by the motor to the hammer at a lower rotational speed than the rotational speed of a rotor of the motor;

wherein the speed-reduction ratio of the speed-reducing-mechanism part is 1/15 or more and 1/100 or less.

18. An impact tool comprising:

a motor;

a hammer, which is rotated by the motor;

an anvil, which is impacted by the hammer in a rotational direction;

a spring, which biases the hammer forward toward the anvil;

a cam mechanism configured to alternately (i) retract the hammer while compressing the spring in the axial direction in response to application of the driving force of the motor and (ii) permit the hammer to be advanced in the axial direction by the elastic force of the compressed spring; and a hammer-housing part, which houses the hammer; wherein:

in the state in which the hammer is at an advancement limit position of the hammer, the spring biases the hammer forward in the axial direction with a set load;

the value calculated by dividing the spring constant (N/mm) of the spring at the advancement limit position by the set load (N) of the spring at the advancement limit position is larger than 0.3; and the impact tool has a maximum fastening torque is 1,300 N·m or more.

19. The impact tool according to claim 13, wherein:

in the state in which the hammer is at the advancement limit position of the hammer in the axial direction, the first spring biases the hammer with a set load; and the value calculated by dividing the spring constant (N/mm) of the first spring at the advancement limit position by the set load (N) of the first spring at the advancement limit position is larger than 0.3.

20. The impact tool according to claim 4, wherein:

at the hammer separation position at which the hammer becomes spaced apart from the anvil in the axial direction, the springs bias the hammer forward in the axial direction with a combined separation load; and the value calculated by dividing the combined spring constant (N/mm) of the springs at the hammer separation position by the combined separation load (N) of the springs at the hammer separation position is larger than 0.09.

* * * * *